United States Patent [19]

Szücs et al.

[11] Patent Number: 4,497,689
[45] Date of Patent: Feb. 5, 1985

[54] HEAT ENGINEERING APPARATUS FOR CARRYING OUT THERMODYNAMICAL PROCESSES COMPRISING A PAIR OF MUTUALLY OPPOSITE PHASE TRANSITIONS OF A WORK MEDIUM

[75] Inventors: László Szücs; Csaba Tasnádi, both of Budapest, Hungary

[73] Assignee: Energiagazdalkodasi Intezet, Budapest, Hungary

[21] Appl. No.: 537,324

[22] Filed: Sep. 30, 1983

Related U.S. Application Data

[63] Continuation of Ser. No. 287,579, Jul. 28, 1981, abandoned.

[30] Foreign Application Priority Data

Aug. 22, 1980 [HU] Hungary .............................. EE-2555

[51] Int. Cl.³ .......................... B01D 1/26; B01D 3/02; B01D 3/06
[52] U.S. Cl. ................................. 202/174; 159/17 R; 159/DIG. 8; 159/DIG. 32; 159/DIG. 33; 202/233; 202/235; 203/71; 203/88; 203/DIG. 17
[58] Field of Search .................................. 202/172–174, 202/232–236; 203/71, 88, 10, 11, DIG. 17, DIG 4; 159/17 R, 17 P, 18, 20 R, DIG. 8, DIG. 32, DIG. 33; 62/17, 476–479, 483–485, 324.1; 165/166

[56] References Cited

U.S. PATENT DOCUMENTS 2,979,443   4/1961   Frankel .............................. 202/173
3,757,856   9/1973   Kun .................................... 165/166
3,966,562   6/1976   Mukushi et al. .................... 202/173

Primary Examiner—Frank Sever
Attorney, Agent, or Firm—Young & Thompson

[57] ABSTRACT

Apparatus for carrying out thermodynamic processes in which a work medium undergoes mutually opposite phase transitions. The apparatus comprises casings consisting of confining plates and spacers therebetween, the casings being arranged in stacked relationship. Each casing encloses a plurality of phase transition compartments in superposed relationship. There are orifices in the confining plates through which pairs of phase transition compartments open directly into one another so as to form a number of work chambers. These are also passages delimited by the spacers in the casings for connecting the work chambers in series and passages delimited by the spacers in the casings for introducing and drawing work medium into and from the phase transition compartments. Finally, there are passages delimited by the spacers in the casings for supplying and abducting heat to and from the work medium.

35 Claims, 48 Drawing Figures

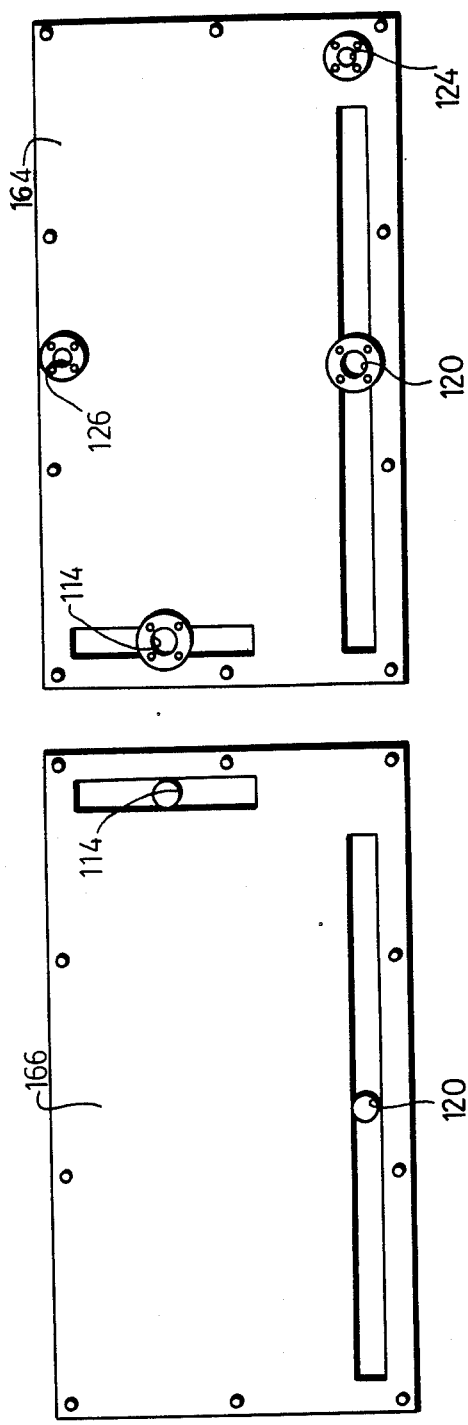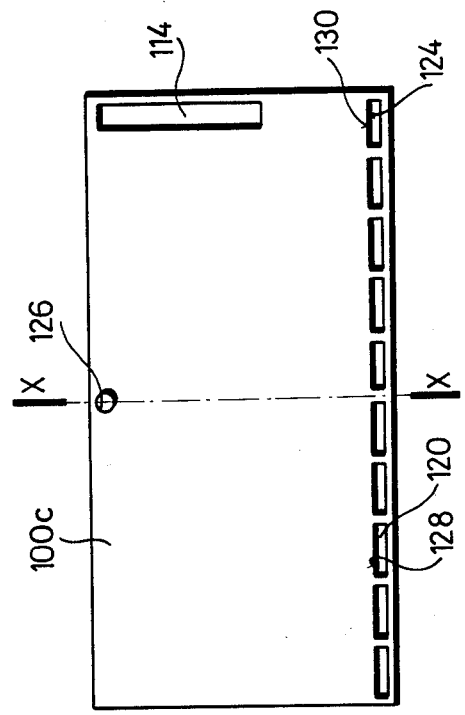

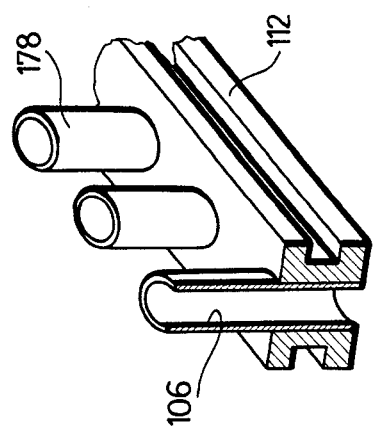
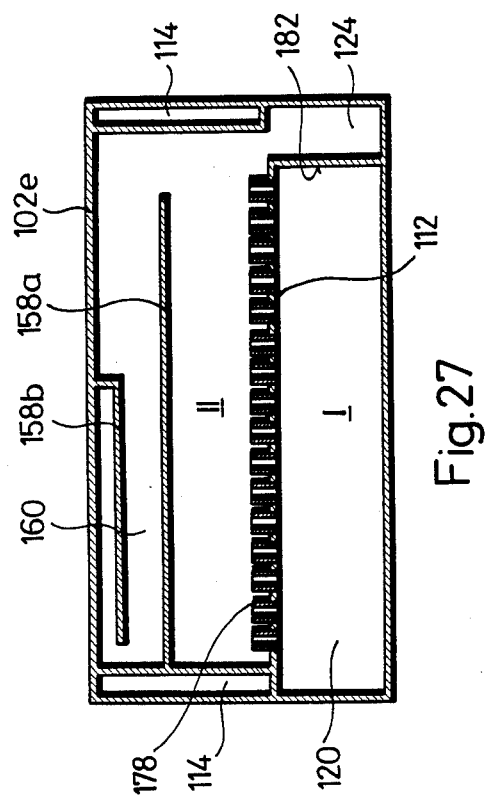
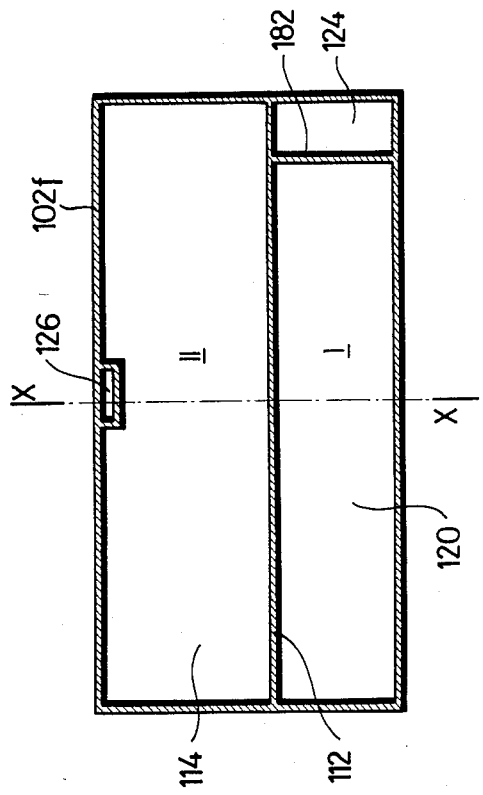
Fig.28
Fig.27
Fig.29

HEAT ENGINEERING APPARATUS FOR CARRYING OUT THERMODYNAMICAL PROCESSES COMPRISING A PAIR OF MUTUALLY OPPOSITE PHASE TRANSITIONS OF A WORK MEDIUM

FIELD OF THE INVENTION

This application is a continuation of application Ser. No. 287,579, filed 7/28/81, abandoned.

This invention relates to heat-engineering apparatus for carrying out thermo-dynamical processes comprising mutually opposite phase transitions of a work medium. Such mutually opposite phase transitions occur each in a phase transition compartment of a work chamber.

The term "work chamber" designates a chamber of the heat-engineering apparatus of practically uniform pressure in which pairs of mutually opposite phase transitions take place while the term "phase transition compartment" refers to portions of the work chamber in which one of the mutually opposite phase transitions occurs or, in other words, the phase of the work medium suffers a one-way transformation, e.g. a liquid is evaporated or a vapour is condensed or absorbed. Each work chamber has at least two of such phase transition compartments.

BACKGROUND OF THE INVENTION

As is known, a phase transition takes place when e.g. under the action of heat or pressure reduction vapours segregate from a solution. However, a phase transition is also an inverse course of the aforesaid process where vapours are condensed by means of heat abduction, or are caused to be absorbed by a solution. Mutually opposite phase transitions occur, for instance, in phase transition compartments of the work chambers of multi-effect and multi-flash evaporators, sorption-type refrigerators and heat pumps.

Known heat-engineering apparatus of such destination consist, as a rule, of cylindrical vessels or receptacles, pipe bundles and of extensive pipings connecting various units of the apparatus which permit, therefore, an exployment of expensive conventional manufacturing technologies only. Moreover, due to the variety of employed units the work chambers of the known heat-engineering apparatus of the above mentioned type are anything but compact. This, on the one hand, entails undesired temperature- and pressure losses thus unfavourably affecting the efficiency of the apparatus and, on the other hand, disadvantageously increases their space requirements.

Such difficulties have partly been mitigated by an introduction of heat exchangers in the form of casings or boxes. Such casings are constructional units formed by pairs of confining plates the mutual distances of which are fixed by spacers therebetween. The spacers may be protuberances embossed from confining plates, or inserts like packings disposed between them, or else optional combinations of such expedients.

Employing heat-exchangers of this type has the obvious advantage that a considerable portion of the heat-engineering apparatus, more particularly its heat-exchangers are enabled to be prepared in mechanized mass production by means of up-to-date manufacturing technology. As an example reference may be taken to the single-stage evaporating and condensing plant "Typ JWP-36" of the firm α-Nirex-Alfa-Laval-Gruppe for delivering a fresh water supply of maritime vessels.

In this known heat-engineering apparatus evaporation of sea water and condensation of vapours /actually steam/ generated thereby, respectively, occurs in a pair of groups of casings abutted groupwise against one another. A pair of adjacent casings have a common confining plate which provides for a heat-transfer relationship therebetween. The two groups of casings are disposed above one another in the enclosure of a cylindrical receptacle. Casings enclosing phase transition compartments are open towards the interior of the receptacle so as to enable vapours to flow from one group of casings into the other one. Thus, a work chamber of the known heat-engineering apparatus under discussion consists of three portions in that its phase transition compartments in the casings communicate with one another through the room enclosed by the receptacle which functions as a transition or third compartment. Consequently, the receptacle is an indispensable part of the apparatus without which its object that is evaporation and condensation or mutually opposite phase transitions cannot be obtained. However, the receptacle which, necessarily, has to be sized for the pressure prevailing in the work chambers of the apparatus can obviously be prepared by means of conventional manufacturing technology only. Thus, such known heat-engineering apparatus are, partly, still unsuitable for mechanized mass production.

SUMMARY OF THE INVENTION

The present invention aims at eliminating conventional manufacturing technology from and permitting employment of mechanized mass production in making of heat-engineering apparatus of the above described type as far as possible.

The main object of the present invention is, essentially, the provision of a heat-engineering apparatus which permits to carry out processes comprising mutually opposite phase transitions such as evaporation and condensation without the necessity of disposing the heat-exchangers of the apparatus in a vessel or, to put it differently, with the elimination of the aforesaid transition or third compartment. Consequently, the casings themselves have to be responsible for the entire performance of a desired thermo-dynamical process. This applies, above all, to conducting a work medium from one phase transition compartment into an other one, e.g. from an evaporator into a condenser. However, it also applies to auxiliary equipments such as demisters, condensing vessels and the like.

Summarily, casings have to be provided which ensure by themselves the whole performance of a desired thermo-dynamical process and, thereby, permit to produce complete heat-engineering apparatus by means of mechanized mass production.

The inventive concept consists in the perception that if casings comprising phase transition compartments are abutted against one another either edgewise or flatwise, their confining plates and their spacers already permit a direct connection between associated phase transition compartments and, thus, a total elimination of the above mentioned transition or third compartment which, otherwise, would be indispensable and would require conventional manufacturing technology. Moreover, it has been recognized that spacers can be fashioned in such a manner that in cooperation with their confining plates they are capable to perform also the functions of auxiliary equipments. This permits to optionally increase the number of work chambers and, thus, to obtain requested outputs even in case of relatively intricate heat-engineering apparatus such as multi-effect or multi-flash evaporators and sorption-type refrigerators produced in mechanized mass production.

Thus, the invention represents an improvement of known heat-engineering apparatus for carrying out thermo-dynamical processes comprising pairs of mutually opposite phase transitions of a work medium the phase transition compartments of which are located in casings composed of confining plates and spacers therebetween where the confining plates serve for heat transfer between adjacent phase transition compartments. This improvement consists in that at least two work chambers are provided, and the phase transition compartments of each work chamber open directly into one another.

It will be seen that work chambers never extend beyond their casings whether the latter comprise one or more complete work chambers or only one or more phase transition compartments the counter parts of which are located in adjacent casings. Thus, essentially, only casings have to be made the main advantage of which is just their suitability for mechanized mass production.

However, the heat-engineering apparatus according to the invention has, in addition to being inexpensive due to the possibility of employing mechanized mass production, further considerable advantages. To begin with, vapours originating in phase transition compartments can be conducted inside casings practically without pressure drops directly to places of inverse phase transitions, that is from one phase transition compartment of a work chamber into an other phase transition compartment of the same work chamber. Thereby an increase of efficiency of the apparatus is obtained. A further advantage consists in a sudden decrease of space requirements which is due to the elimination of transition or third compartments as has been mentioned above. Even in case of a plurality of work chambers there is no need to place their casings in a receptacle. Furthermore, even intricate heat-engineering apparatus can readily be cleaned because their casings are directly accessible and dismountable without the necessity of removing them from larger units such as receptacles.

BRIEF DESCRIPTION OF THE DRAWING

Hereinafter the invention will be described in greater details by taking reference to the accompanying drawing which shows, by way of example, embodiments of the heat-engineering apparatus according to the invention and in which:

FIG. 16a illustrates a part of a heat-engineering apparatus according to the invention embodying the connection diagram shown in FIG. 15 in a longitudinal sectional view taken along line XVIa—XVIa of FIG. 17a.

FIG. 17a shows a sectional view taken along line XVIIa—XVIIa of FIG. 16a.

FIG. 18 illustrates an elevational view taken along line XVIII—XVIII of FIG. 16b.

FIG. 19 is an elevational view taken along line XIX—XIX of FIG. 16a.

FIG. 20 shows an elevational view taken along line XX—XX of FIG. 16a.

FIG. 21 represents an elevational view taken along line XXI—XXI of FIG. 16a.

FIG. 22 illustrates an elevational view taken along line XXII—XXII of FIG. 16a.

FIG. 27 is a sectional view taken along line XXVII—XXVII of FIG. 16b.

FIG. 28 shows a perspective view of a detail at an enlarged scale.

FIG. 29 represents a sectional view taken along line XXIX—XXIX of FIG. 16b.

Figure 3:
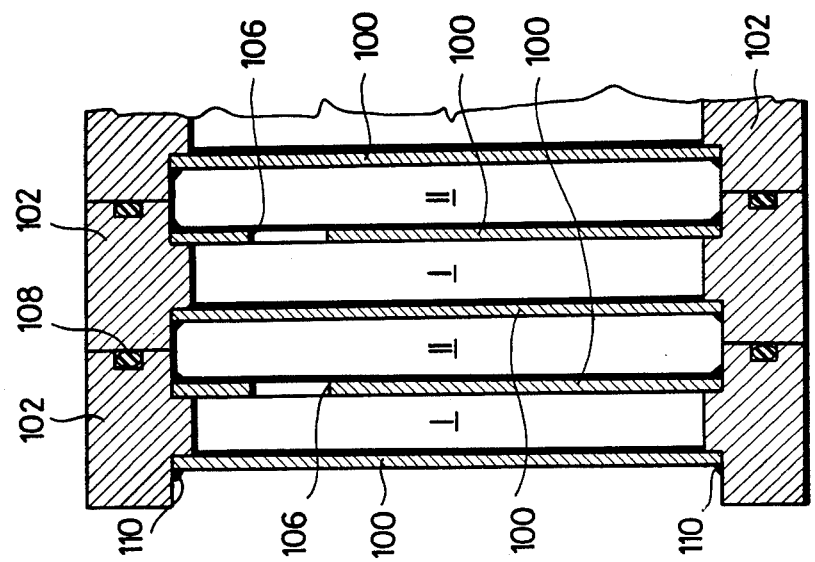
FIG. 3 represents a longitudinal sectional view of further exemplified embodiments of casings.

Same reference characters designate similar details throughout the drawing. Generally, it is to be noted that work chambers and their phase transition compartments and sub-compartments are referred to by Roman numerals. Sofar chambers and/or chamber portions of the same nature or function are meant, they are distinguished from one another by suffixes in the form of capital letters. If further distinguishing is needed the reference characters consisting of Roman numerals and capital letters are complemented by Arabic numerals. Casings are referred to, as a rule, by a joint application of the reference characters designating their confining plates and their spacers.

DESCRIPTION OF THE PREFERRED EMBODIMENTS

Explanation of Terms

In the drawing FIGS. 1 to 7 serve for explaining of what is meant in the present specification and claims by the terms "work chamber", "phase transition compartment", "phase transition subcompartment", "confining plate", "spacer" and "casing".

Figure 1:
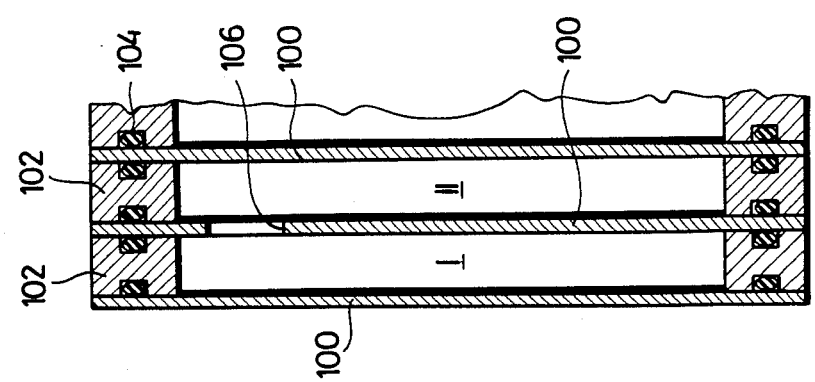
FIG. 1 is a longitudinal sectional view showing characteristic features of casings used with the invention.

In FIG. 1 reference character 100 designates confining plates which pairwise sandwich spacers 102. In the instant case the spacers 102 constitute component parts independent of the confining plates 100, and have packings 104 in their front surfaces. However, spacers themselves may function as packings.

A pair of confining plates 100 together with a spacer 102 therebetween constitute a casing 100-102-100. If alternately arranged confining plates 100 and spacers 102 are abutted against one another flatwise as illustrated, adjacent casings 100-102-100 have pairwise common confining plates 100.

Compartments enclosed each by one of a pair of adjacent casings 100-102-100 communicate with one another through an orifice 106 in their common confining plate 100. If one of the casings is heated while the other one is cooled through their extreme confining plates 100, respectively, mutually opposite phase transitions of a work medium will take place in such compartments. Correspondingly, they will be labeled phase transition compartments and designated by reference characters I and II, respectively.

A pair of such phase transition compartments I and II from a work chamber I-II which is the place where a complete thermo-dynamical process consisting of mutually opposite phase transitions occurs.

Figure 2:
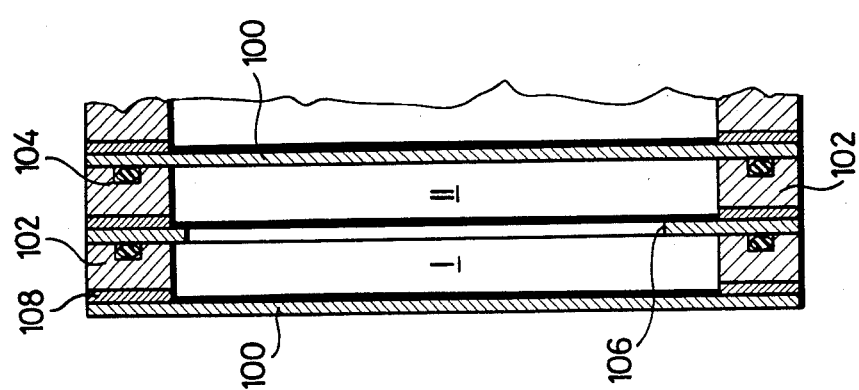
FIG. 2 shows somewhat modified casings likewise in a longitudinal sectional view.

FIG. 2 shows a pair of casings 100-102-100 which differs from the previous embodiment in two aspects.

On the one hand, the spacers 102 are fixed each to one of the confining plates 100 by an adhesive layer 108.

On the other hand, the orifice 106 is extended to the entire contacting areas of associated phase transition compartments I and II. In such case both phase transition compartments I and II are distinguished only by their functions and by the casings in which they are located while in the previous case they were spatially separated by their common confining plate.

With the embodiment shown in FIG. 3 the confining plates 100 and the spacers 102 are mutually fixed by weldings designated by reference characters 110. Moreover, the spacers 102 protrude beyond the confining plates 100 in axial direction so that with mutually abutted casings interstices are formed on both sides thereof. In such case two sorts of casings may be distinguished. The casings with welded on confining plates 100 are self-contained units. The casings of the other sort are formed by the confining plates 100 and the protruding portions of the spacers 102 of a pair of self-contained casings. A similar solution may, however, simply be obtained by means of self-contained units with no protruding spacer portions instead of which packings are employed for separating the members of a pair of self-contained casings.

FIGS. 1 to 3 show embodiments with casings 100-102-100 abutted against one another flatwise along common confining plates 100, each of the casings enclosing a phase transition compartment I or II. In other words, the phase transition compartments I and II are each in an other casing. It is, however, possible to locate both phase transition compartments I and II in the same casing 100-102-100.

Figure 4:
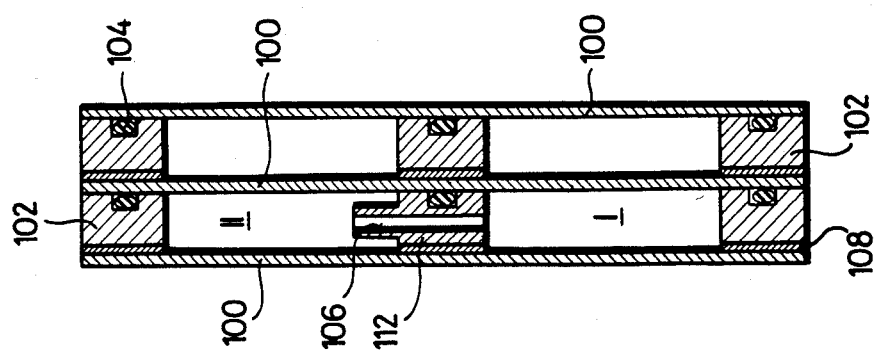
FIG. 4 illustrates still further exemplified embodiments of casings in a longitudinal sectional view.

In FIG. 4, for instance, a pair of casings 100-102-100 are shown one of which comprises both phase transition compartments I and II of a work chamber I-II arranged above one another. Such casing differs from that shown in FIG. 2 in that it has a partition 112 which, in the instant case, serves as a spacer as well and by which the enclosure of the casing is subdivided into a lower phase transition compartment I and an upper phase transition compartment II while the orifice 106 connecting both phase transition compartments is provided in the partition 112. Thus, a whole work chamber I-II is disposed in a single casing 100-102-100. It will be seen that, in a similar manner, also phase transition compartments having the same function may be located above one another in which case the respective work chambers will be comprised by more than one casing. The compartments of the right-hand casing 100-102-100 in FIG. 4. serve for conducting heating and cooling media, respectively.

Figure 5:
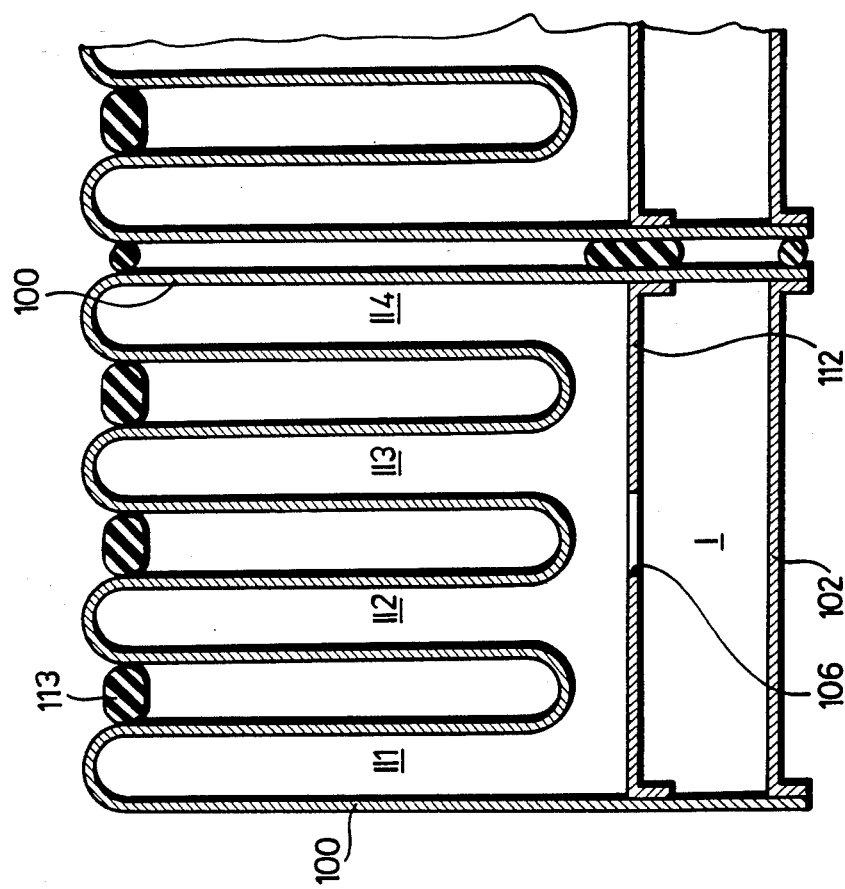
FIG. 5 is a longitudinal sectional view of an other exemplified embodiment of a casing.

The embodiment illustrated in FIG. 5 has likewise a complete work chamber in a single casing 100-102-100 with a partition 112. Here, however, a phase transition compartment I is associated with a plurality of phase transition subcompartments II1, II2, II3 and II4 which may be regarded as subdivisions of a single phase transition compartment II. For such purpose the confining plate 100 of the casing 100-102-100 is, above the partition 112, sinuously shaped in the manner of a train of waves. The phase transition subcompartments II1, II2, II3 and II4 occupy each one of the waves the interstices between the crests of which may be closed, as in the instant case, by packings 113 and used e.g. for conducting a cooler medium.

As will be seen later /FIGS. 11 and 12/, such subdivision may be applied to any phase transition compartment.

Figure 6:
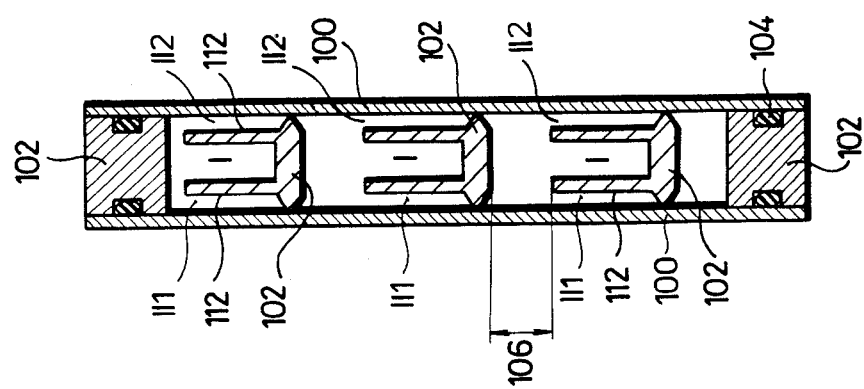
FIG. 6 shows still an other exemplified casing in a longitudinal sectional view.

With the embodiment shown in FIG. 6 a plurality of complete work chambers are disposed above one another in the same casing 100-102-100. The work chambers are separated from one another by means of spacers 102. Partitions 112 on the spacers 102 delimit a phase transition compartment I from a pair of phase transition subcompartments II1 and II2, and enclose with a spacer 102 above orifices 106 through which the phase transition compartment I and phase transition subcompartments II1 and II2 of each work chamber I-II1-II2 communicate with one another. As can be seen, the phase transition subcompartments II1 and II2 occupy places on opposite sides of the phase transition compartment I. The significance of such arrangement will be explained in connection with FIG. 37.

FIGS. 1 to 6 show embodiments where confining plates 100 and spacers 102 are individual component parts even though they are mutually fixed as shown e.g. in FIGS. 2 to 4.

Figure 7:
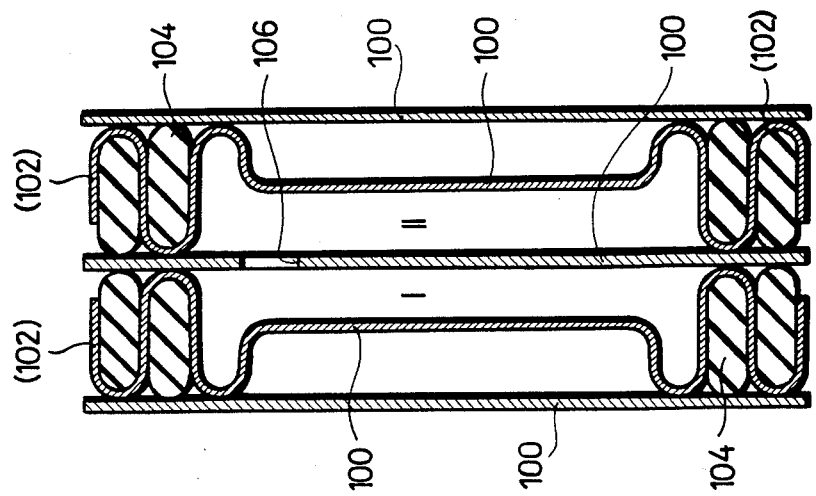
FIG. 7 represents, by way of example, a further embodiment of a pair of casings likewise in a longitudinal sectional view.

However, the function of the spacers 102 can be performed by the confining plates 100 themselves. Such embodiment is shown in FIG. 7 where the spacers are formed by embossments of the confining plates 100 of a pair of casings. To suggest such function of the embossments of the confining plates 100 they carry the reference character 102 of the spacers in brackets.

For sake of clarity, FIGS. 1 to 7 illustrate only what is deemed to be indispensable for an unambiguous interpretation of the basic terms /work chamber, phase transition compartment, phase transition subcompartment, confining plate, spacer and casing/ used in the present specification and claims.

Since, as a rule, it is a depression which prevails in work chambers of heat-engineering apparatus with which the present invention is concerned, considerably more spacers are employed in the casings of operable apparatus than illustrated in the Figures hitherto discussed. Likewise, passages for conducting a work medium and the phases thereof as well as means for heating and cooling responsible for phase transitions of a work medium have mostly been omitted from these Figures.

On the other hand, all FIGS. 1 to 7 show confining plates 100, spacers 102, casings 100-102-100 formed by them, phase transition compartments I and II, phase transition subcompartments II1, II2, etc., and orifices 106 through which phase transition compartments I and II whether integral or subdivided open directly into one another and unite to work chambers I-II. It is shown that phase transition compartments I and II may be placed each in an other casing 100-102-100 as in case of FIGS. 1 to 3 and 7, or may occupy the same casing 100-102-100 as illustrated in FIGS. 4 and 5. Accordingly, also work chambers I-II may be extended over more than one casing or comprised by a single casing. Moreover, it will be apparent that a single casing may comprise even several complete work chambers. Finally, it will be apprehended that the term "casing" does not necessarily designate self-contained units. Actually, within the scope of the present invention, all structures are deemed to be casings which confine at least one phase transition compartment irrespective of the number of their component parts which may belong to more than one casing such as the common confining plates or the axially protruding portions of spacers described above.

The basic terms used in describing and claiming the present invention having been clarified it will now be shown how various heat-engineering apparatus can be composed of casings in compliance with the present invention.

MULTI-EFFECT EVAPORATORS IN PRINCIPLE

Figure 8:
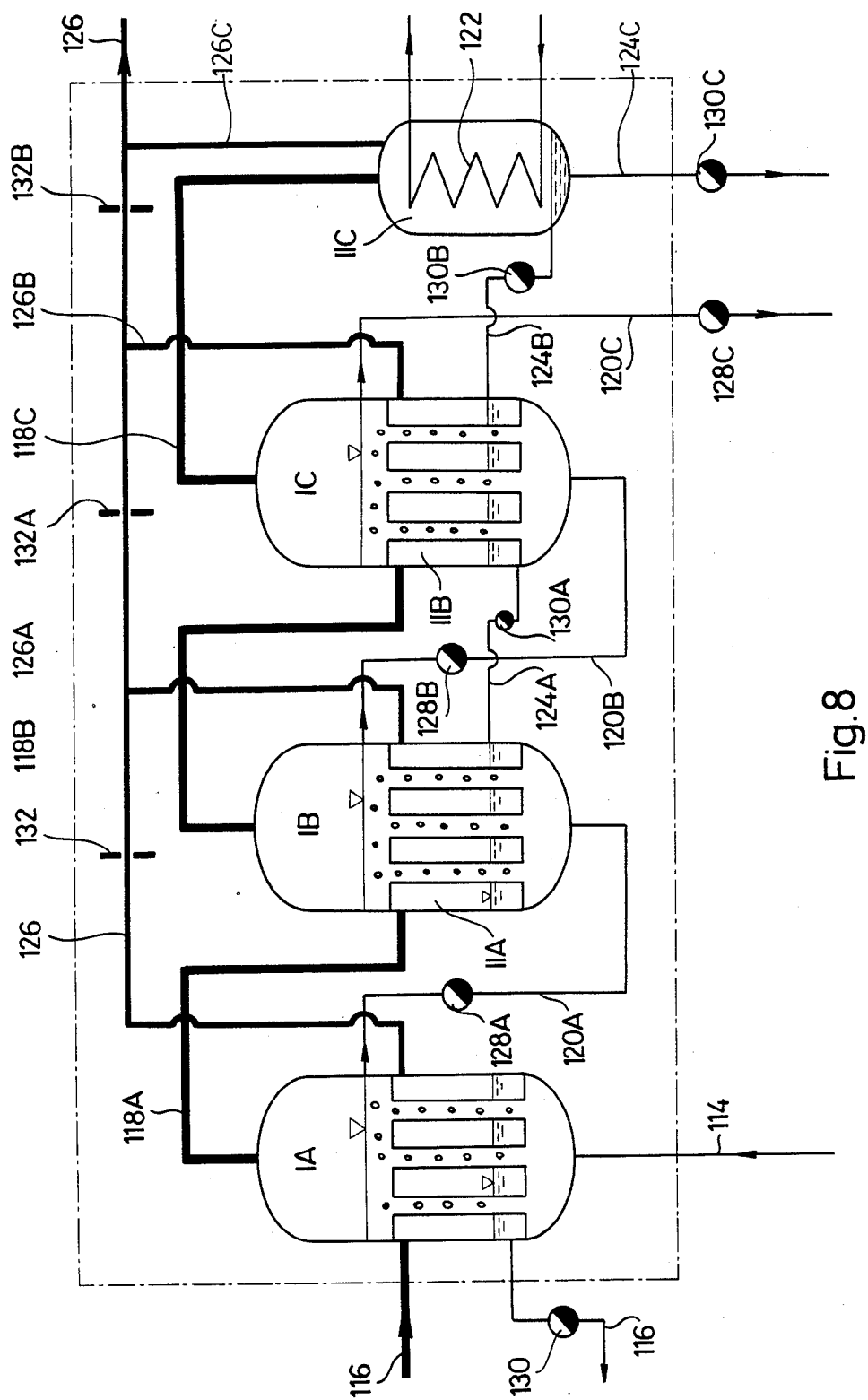
FIG. 8 illustrates a conventional connection diagram of a multi-effect evaporator with three stages.

FIG. 8 shows a conventional connection diagram of a three-stage multi-effect evaporator. Such connection diagrams are well known in the art and, therefore, the connection diagram illustrated in FIG. 8 will be described hereinafter by taking reference to details only which are relevant to the present invention.

Capital letters A, B and C added to reference characters refer to the various stages of the evaporator. Each work chamber consists of a pair of phase transition compartments IA and IIA, IB and IIB, and IC and IIC, and is referred to by a combination of the reference characters of the latter. Thus, the work chamber of stage A is designated by IA-IIA, the work chamber of stage B by IB-IIB, and the work chamber of stage C by IC-IIC.

Obviously, the work chambers are upstream work chambers or downstream work chambers according to mutual relationships of the various stages A, B and C. Thus, work chamber IA-IIA of stage A is an upstream work chamber with respect to work chamber IB-IIB of stage B which is, in turn, a downstream work chamber as regards work chamber IA-IIA of the previous evaporating stage A, and an upstream work chamber in relation to work chamber IC-IIC of the subsequent evaporating stage C, and so on.

A solution to be evaporated is introduced through a passage 114 into the phase transition compartment IA of work chamber IA-IIA of the first evaporator stage A where it enters in heat-transfer relationship with a heating medium such as steam flowing in a passage 116, and becomes partly evaporated. Thus, the phase transition compartment IA performs the function of evaporation and, therefore, is labelled "evaporating" phase transition compartment.

Resulting vapours are conducted through a passage 118A into phase transition compartment IIA of work chamber IA-IIA where they are condensed. Accordingly, this compartment is referred to as "condensing" phase transition compartment.

The condensation heat of the vapours is used for heating the partly evaporated solution which flows from the evaporating phase transition compartment IA through a passage 120A into the evaporating phase transition compartment IB of the work chamber IB-IIB of the second stage B of the evaporator.

Vapours generated here and conducted by a passage 118B into the associated condensing phase transition compartment IIB become condensed, their condensation heat being employed for evaporating the solution which flows from the evaporating phase transition compartment IB through a passage 120B into the evaporating phase transition compartment IC of the third work chamber IC-IIC associated with the third stage C of the evaporator. The remainder of the solution in the form of a concentrate withdraws through a passage 120C.

Vapours formed in the evaporating phase transition compartment IC are introduced through a passage 118C into the condensing phase transition compartment IIC of the third work chamber IC-IIC where they enter into heat-transfer relationship with a cooler medium, e.g.

water which flows in a passage 122, and become condensed.

Condensates formed in the condensing phase transition compartments IIA and IIB are conducted through passages 124A and 124B likewise into the condensing phase transition compartment IIC from where they withdraw together with the condensate of the third stage C in the form of a distillate through a passage 124C.

Reference character 126 designates a deaerating passage connected to the condensing phase transition compartments IIA, IIB and IIC through deaerating passages 126A, 126B and 126C, respectively. The deaerating passage 126 is connected to a deaerator well known in the art and, therefore, not represented in FIG. 8.

Phase transition compartments of similar functions of the individual work chambers IA-IIA, IB-IIB and IC-IIC are separated from one another and from the ambiency by pressure reducing means 128A, 128B, 128C and 130A, 130B, and 130C, respectively, such as condensing vessels. Reference character 130 designates a pressure reducing means in a downstream section of the passage 116 of heating steam, and reference characters 132, 132A and 132B refer to pressure reducing means such as throttle orifices in the deaerating passage 126. As is well known in the art, such means serve to maintain pressure differences between various condensing phase transition compartments.

A MULTI-EFFECT EVAPORATOR COMPOSED OF CASINGS

Figure 9:
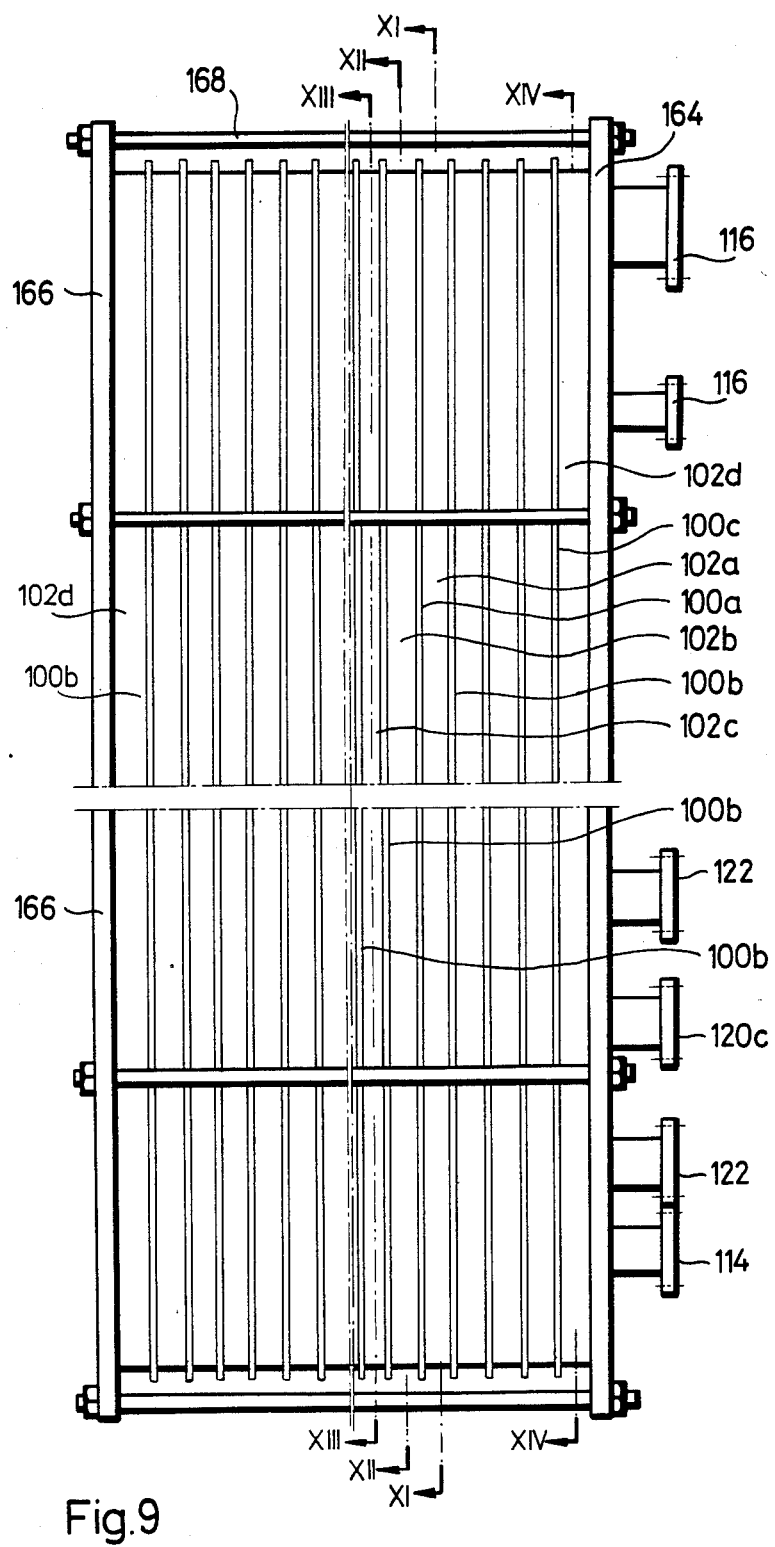
FIG. 9 is a side-elevational view of an evaporator according to the invention embodying the connection diagram shown in the previous Figure.
Figure 10:
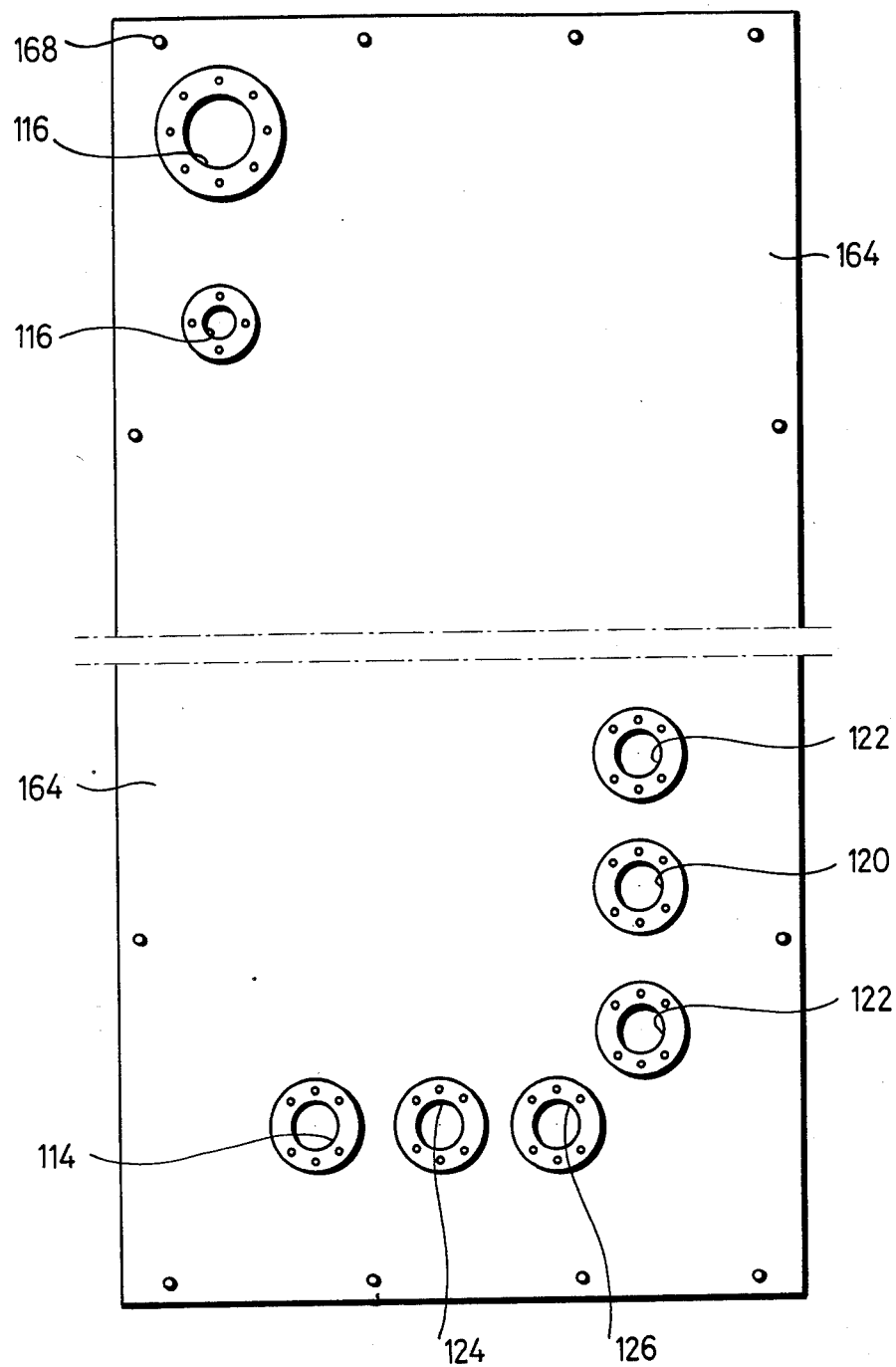
FIG. 10 shows a front-elevational view of the multi-effect evaporator illustrated in FIG. 9.

FIGS. 9 to 14 show an exemplified three-stage multi-effect evaporator in compliance with the present invention and the connection diagram of FIG. 8. As will be seen, everything that lies inside the confines of a block suggested by dash-and-dot lines in FIG. 8 is, together with other auxiliary equipments, realized within casings which are, as shown in FIG. 9, flat-wise abutted against one another along common confining plates.

More particularly, the three work chambers IA-IIA, IB-IIB and IC-IIC of the connection diagram shown in FIG. 8 are comprised, in the instant case, by three casings because their evaporating phase transition compartments are, in compliance with an additional feature of the present invention, subdivided into two casings. The significance of such expedient will be apparent in the course of the following explanations.

For sake of simplicity, the three casings will be referred to as "first", "second" and "third" casings. They are illustrated in FIGS. 11 to 13, respectively.

Figure 11:
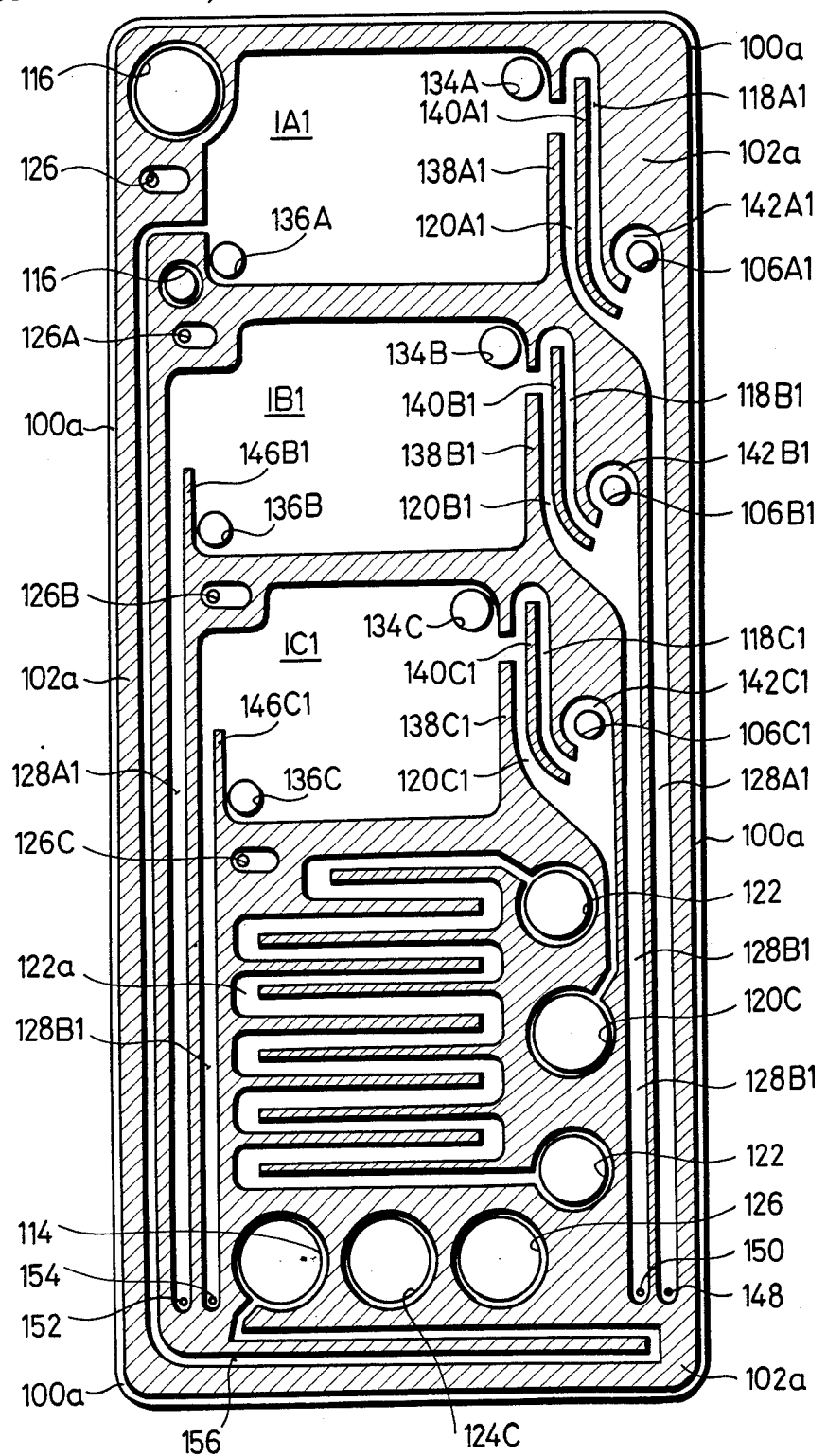
FIG. 11 represents a sectional view taken along line XI—XI of FIG. 9.
Figure 13:
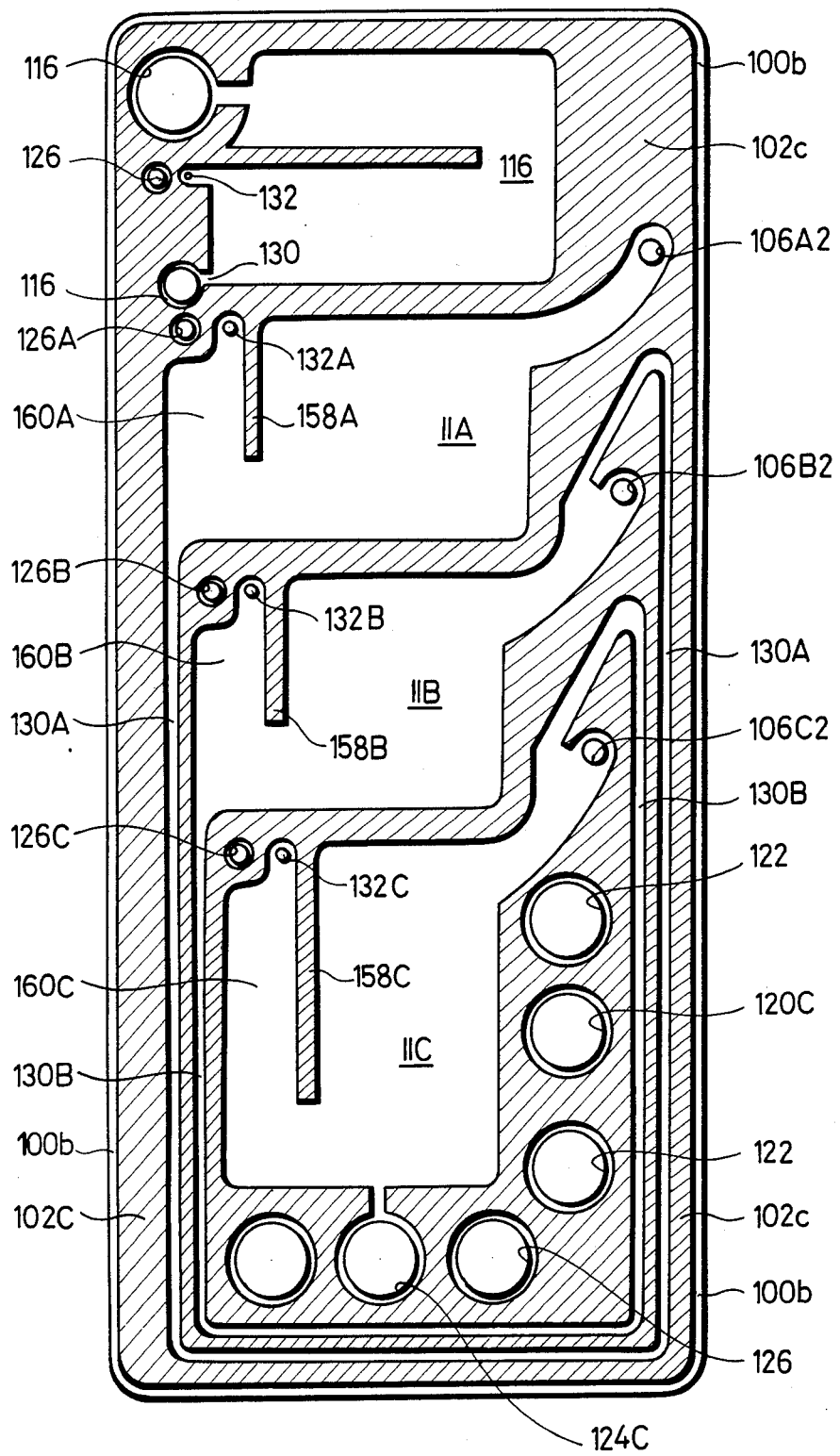
FIG. 13 is a sectional view taken along line XIII—XIII of FIG. 9.
Figure 12:
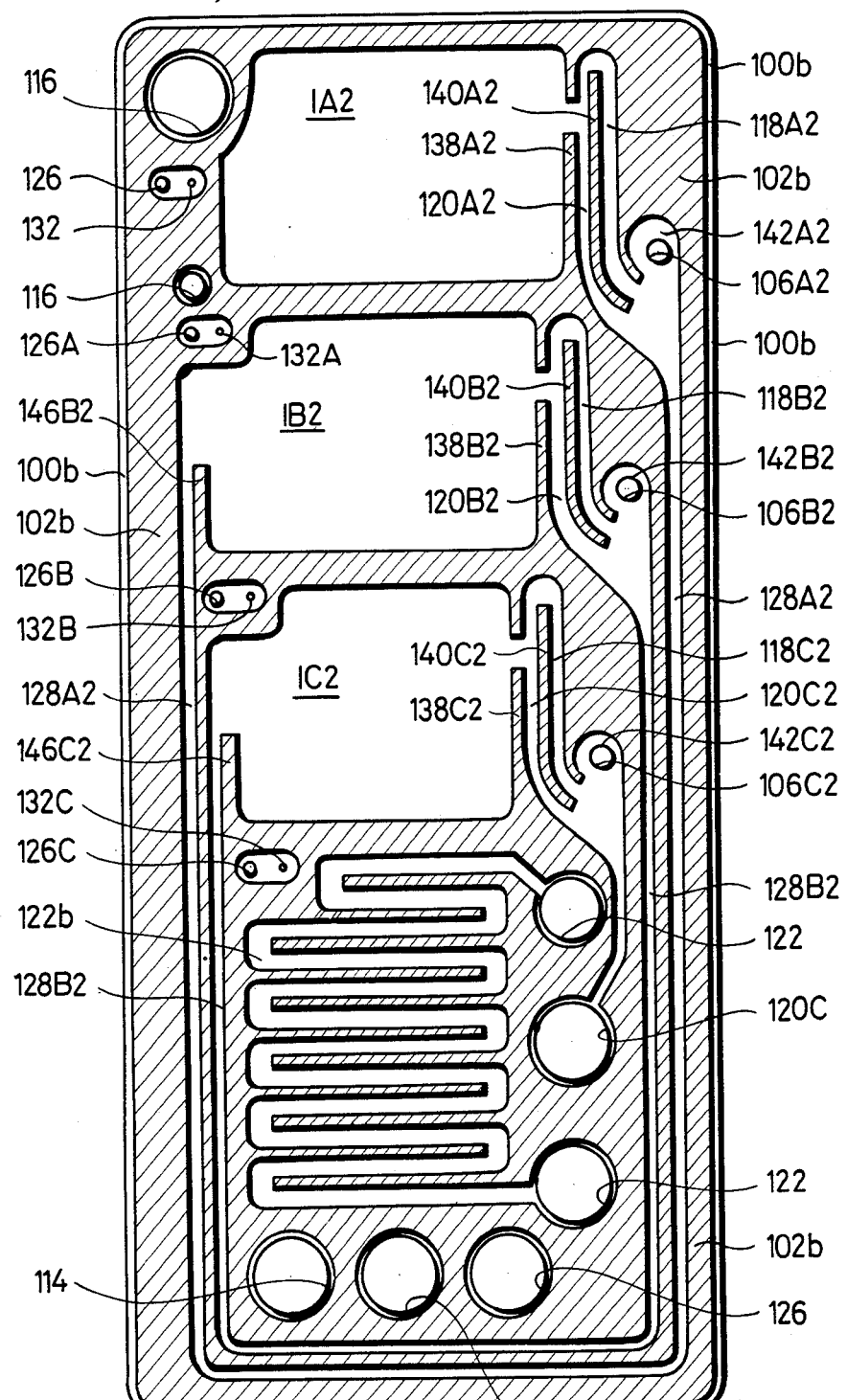
FIG. 12 illustrates a sectional view taken along line XII—XII of FIG. 9.

The first casing shown in FIG. 11 and the second casing shown in FIG. 12 enclose subcompartments IA1, IA2, IB1, IB2, IC1 and IC2 of subdivided evaporating phase transition compartments IA1-IA2, IB1-IB2 and IC1-IC2 while the third casing shown in FIG. 13 encloses condensing phase transition compartments IIA, IIB and IIC. Phase transition compartments and subcompartments of similar function /evaporation and condensation, respectively/ of the three work chambers IA1-IA2-IIA, IB1-IB2-IIB and IC1-IC2-IIC are located above one another in individual casings while the casings themselves are abutted against one another flatwise along common confining plates.

There are two sorts of confining plates 100a and 100b which, likewise for sake of simplicity, will be referred to as "first" and "second" confining plates, respectively.

Spacers of the three casings all differ from one another and are, therefore, referred to by different reference characters 102a, 102b and 102c as "first", "second" and "third" spacers, respectively. They are shown in FIGS. 11 to 13 each with a confining plate therebehind.

First confining plate 100a is common to the first and second casings /FIGS. 11 and 12/. It has orifices 134A, 136A, 134B, 136B and 134C, 136C by which a uniform pressure is ensured in associated evaporating phase transition subcompartments IA1 and IA2, IB1 and IB2, and IC1 and IC2, respectively.

Second confining plate 100b separates the subdivided evaporating phase transition compartments IA1-IA2, IB1-IB2 and IC1-IC2 from their associated condensing phase transition compartments IIA, IIB and IIC, respectively; comprised by the third casing /FIG. 13/. It is common to the second casing /FIG. 12/ and the third casing /FIG. 13/.

The three casings, sofar described, form a functional unit of which the instant multi-effect evaporator is built up and details of which are as follows.

To begin with, it will be appreciated that the condensing phase transition compartment of an upstream work chamber is in heat-transfer relationship with the evaporating phase transition compartment of a subsequent downstream work chamber through a common confining plate. Thus, the evaporating phase transition compartment IB1-IB2 of the second work chamber IB1-IB2-IIB is in heat-transfer relationship with the condensing phase transition compartment IIA of the first work chamber IA1-IA2-IIA while the evaporating phase transition compartment IC1-IC2 of the third work chamber IC1-IC2-IIC is in heat-transfer relationship with the condensing phase transition compartment IIB of the second work chamber IB1-IB2-IIB through the common second confining plate 100b of the second and third casing /FIGS. 12 and 13/.

Furthermore, at the downstream extremity of each of the evaporating phase transition compartments there is an overflow weir through which an evaporating phase transition compartment communicates with a downstream channel. Thus, evaporating phase transition subcompartment IA2 has an overflow weir 138A2. Its downstream channel 118A2-120A2 is subdivided by a partition 140A2 into a vapour conducting passage 118A2 on one side of the partition 140A2 and a liquid conducting passage 120A2 on the other side thereof the functions of which correspond to those of the passages 118A and 120A, respectively, in the connection diagram shown in FIG. 8.

The vapour conducting passage 118A2 of the downstream channel 118A2-120A2 opens into a demisting vortex chamber 142A2 downstream of the phase transition subcompartment IA2 which, in compliance with one of the main features of the present invention, opens directly into the condensing phase transition compartment IIA /FIG. 13/ of the first work chamber IA1-IA2-IIA through an orifice 106A2 which corresponds to the orifice 106 described in connection with FIGS. 1 to 7. /By the way, such direct connection between evaporating and condensing phase transition compartments applies to condensing phase transition subcompartment IA1 as well because it is adjacent to a further casing like that shown in FIG. 13 as will be apparent from what follows./

As is known, withdrawing vapours produced by evaporation, boiling or pressure reduction /adiabatical evaporation/ may, e.g. due to a tendency to foaming of a parent liquid, carry away a considerable number of liquid droplets. Therefore, phase transition compartments for such processes ought to be relatively large so that floating droplets be enabled to fall back from the withdrawing vapours into their parent liquid. Obviously, demister means such as vortex chambers in the flow path of vapours withhold suspended droplets and permit the employment of relatively smaller evaporating phase transition compartments. It is an advantageous feature of the present invention that vortex chambers are easily feasible within the casings by correspondingly shaping their spacers as has been shown in connection with vortex chamber 128A2.

The liquid conducting passage 120A2 of the downstream channel 118A2-120A2 communicates with a siphon 128A2 which corresponds to the pressure reducing means 128A in the connection diagram illustrated in FIG. 8, and connects the liquid conducting passage 120A2 associated with the evaporating phase transition subcompartment IA2 of the first work chamber IA1-IA2-IIA with the evaporating phase transition subcompartment IB2 of the second work chamber IB1-IB2-IIB.

As is known, siphons are suitable to ensure a flow exempt of vapours of a liquid between a pair of stages of different pressures within relatively wide limits as regards pressure drops and flow rates.

In case of saturated liquids practically three types of siphons may be distinguished.

There are cooled siphons in which a flowing liquid is cooled to the temperature of a downstream pressure thereby preventing a boiling of the liquid. If cooled siphons are employed as condensing vessels, a similar pressure difference can be maintained as with siphons carrying unsaturated liquids. Cooled siphons are used e.g. with multi-effect evaporators for separating chambers of different pressures in which concentrates and distillates, respectively, are collected.

Furthermore, there are adiabatical siphons which connect, in the manner of condensing vessels, the liquid containing portions of an upstream chamber of higher pressure and a downstream chamber of lower pressure. Nevertheless, they prevent a flow of vapours therebetween. Thus, the pressure difference between both chambers stays maintained. A liquid introduced from the upstream chamber into the downstream chamber becomes boiling and evaporates. Such siphons are employed e.g. in multi-flash evaporators.

Finally, there are heated siphons in which heating produces a pumping effect in saturated liquids which is the working principle of so-called thermosiphon pumps. Thus, heated siphons are suitable to further a liquid from a downstream chamber of lower pressure into an upstream chamber of higher pressure or, in case of chambers of equal pressures, to raise a liquid from a lower level to a higher level. Such thermosiphons are used e.g. in sorption-type refrigerators.

In case of the present invention cooled or heated siphons may be obtained e.g. by associating a siphon with a cooling or heating passage in the spacer of an adjacent casing through a common confining plate in such a manner that siphon and cooling or heating passage register at least partly with one another.

In the instant case, the siphon 128A2 belongs to the above described first group of siphons and opens into subcompartment IB2 of the evaporating phase transition compartment IB1-IB2. At the upstream extremity of this subcompartment IB2 there is a dam 146B2 which is lower than the overflow weir 138B2 at its downstream extremity. The dam 146B2 prevents that a horizontal intermediate branch of the siphon 128A2 be obstructed by impurities.

The other evaporating phase transition subcompartments have similar features as indicated by the system of reference characters. However, the passages 120C1 and 120C2 leading from the evaporating phase transition compartment IC1-IC2 of the third work chamber IC1-IC2-IIC open, in accordance with the connection diagram shown in FIG. 8, into a common concentrate abducting passage 120C.

Now the significance of the subdivision of the evaporating phase transition compartments into subcompartments referred to above can simply be explained:

In the common first confining plate 100a of the adjacent first and second casings /FIGS. 11 and 12/ there are orifices 148, 150, 152 and 154 which connect pairwise descending and ascending branches of siphons 128A1, 128A2, 128B1 and 128B2. Thus, a subdivision of the evaporating phase transition compartments permits that the siphons have common intermediate branches provided, with the exemplified embodiment, in the second casing /FIG. 12/. The first casing /FIG. 11/ comprises, instead, a cooling passage 156 for conducting a solution to be evaporated and, thus, communicating with passage 114 /FIG. 8/.

The evaporating phase transition compartment IA1-IA2 of the first work chamber IA1-IA2-IIA as an upstream evaporating phase transition compartment comprised by the first and second casings /FIGS. 11 and 12/ has, in the instant case and in compliance with the connection diagram shown in FIG. 8, the heat needed for evaporation supplied to it at least partly from a heating passage 116 in the third casing /FIG. 13/ which is in heat-transfer relationship with the evaporating phase transition compartment IA1-IA2 through the common second confining plate 100b between the second and third casings /FIGS. 12 and 13/.

On the other hand, the condensation heat in the condensing phase transition compartment IIC of the third work chamber IC1-IC2-IIC as a downstream condensing phase transition compartment comprised by the third casing /FIG. 12/ is, in the instant case and likewise in compliance with the connection diagram shown in FIG. 8, abducted by a fluid flowing in cooling passages 122A and 122b in the first and second casings /FIGS. 11 and 12/, respectively, likewise through the common second confining plate 100b therebetween.

As has been indicated, the condensing phase transition compartments IIA, IIB, and IIC are provided in the third casing /FIG. 13/ and are likewise interconnected by siphons 130A and 130B which correspond to the pressure reducing means designated by the same reference characters in the connection diagram shown in FIG. 8. Moreover, their horizontal intermediate branches are registering with the cooling passage 156 in a subsequent first casing such as shown in FIG. 11 and are, thus, likewise in heat-transfer relationship therewith through a second common confining plate 100b.

Thus, all siphons are in heat-transfer relationship with a cooling passage. It means that, without employing heat exchangers and pipe conduits, siphons of relatively lesser constructional height may be used which is an obvious advantage of the present invention.

The condensing phase transition compartments IIA, IIB and IIC comprised by the third casing /FIG. 13/ are provided, in the instant case, with means for deaeration.

Deaeration of condenser chambers is well known in the art. For such purpose deaerating post- or downstream coolers are used which are connected by pipe conduits with condenser chambers to be deaerated. As will be seen, the present invention permits to eliminate deaerating pipe conduits and downstream coolers as individual constructional units simply by means of complementing the condensing phase transition compartments of the work chambers with deaerating compartments communicating therewith through pressure reducing means. The latter ensure that pressures prevailing in the deaerating compartments be, by a predetermined amount, always lesser than the pressures prevailing in the respective condensing phase transition compartments and, thus, prevent a backflow of air.

With the represented embodiment the pressure reducing means of condensing phase transition compartment IIA is a throttle orifice 132A /see also FIG. 8/ formed in the second confining plate 100*b*.

Furthermore, in the instant case, the condensing phase transition compartment IIA has an extension 158A upstream the throttle orifice 132A which delimits a pre-deaerating bay or niche 106A therein formed by the third spacer 102*c*. Such bay or niche 160A ensures pre-deaeration at the proper pressure of the condensing phase transition compartment IIA so that less vapour flows into its associated deaerating compartment of lesser pressure which is favourable from a thermodyanamical point of view as will be evident to the skilled art worker.

The condensing phase transition compartments IIB and IIC are similarly provided with throttle orifices 132B and 132C and with extensions 158B and 158C, respectively.

Figure 14:
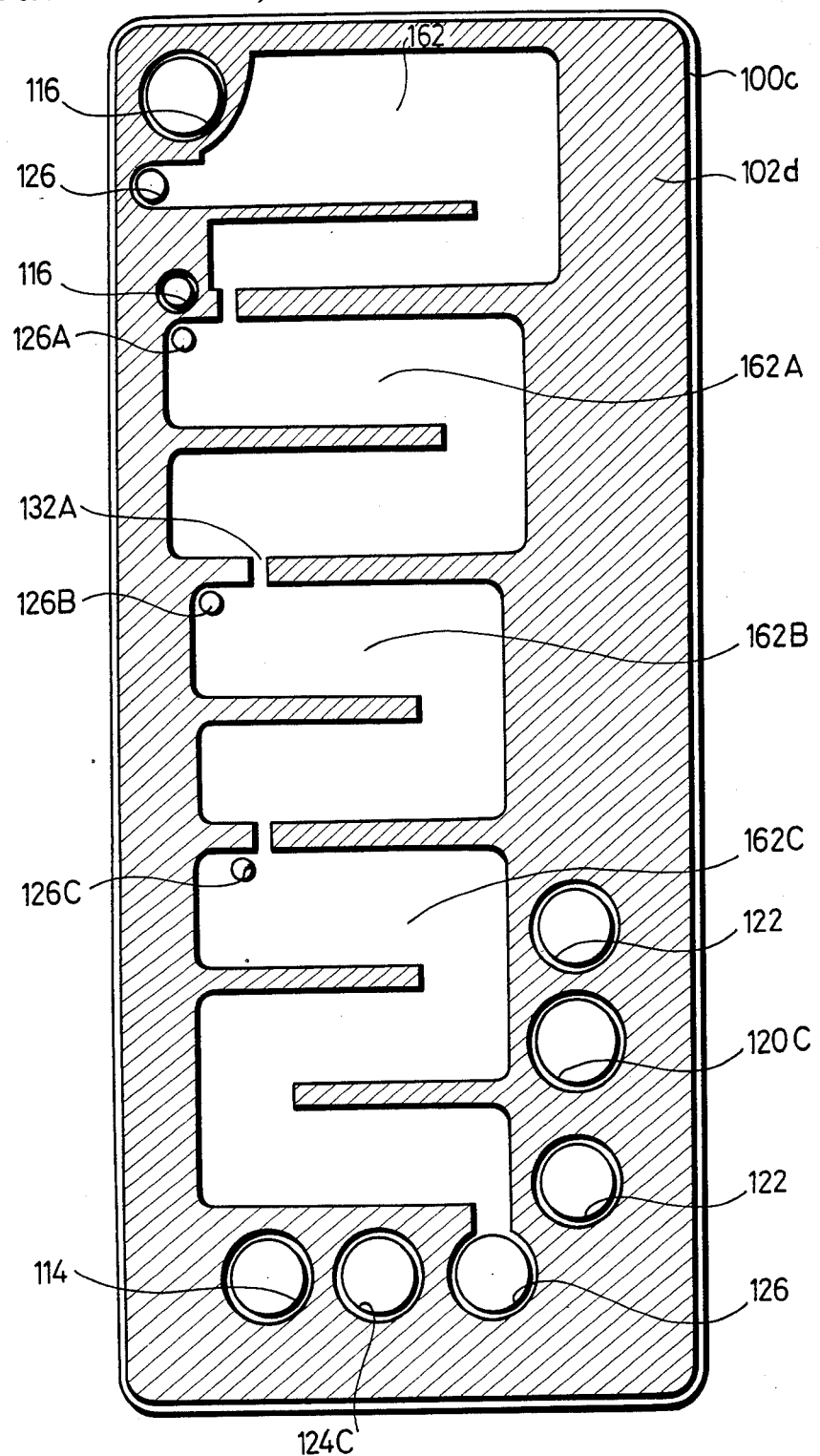
FIG. 14 shows a sectional view taken along line XIV—XIV of FIG. 9.

Moreover, with the represented embodiment, the deaerating compartments are located in a further "deaerating" casing shown in FIG. 14 with a third confining plate 100*c* and a fourth spacer 102*d*. The employment of such deaerating casings is particularly favourable in case of a plurality of work chambers since, then, deaeration of all condensing phase transition compartments as well as of heating passages 116 of an evaporator can be obtained by means of a single constructional unit with which the former communicate, as it were, in parallel connection.

Various deaeration compartments in the deaerating casing are referred to by reference characters 162, 162A, 162B and 162C while other details are designated in accordance with the connection diagram shown in FIG. 8. The confining plate 100*c* is common to the deaerating casing /FIG. 14/ and to an above described first casing /FIG. 11/ which are, thus, in heat-transfer relationship with one another therethrough as goes forth from FIG. 9.

It will be seen that, in the instant case, all common confining plates 100*a*, 100*b* and 100*c* between adjacent casings have heat-transfer areas decreasing in downstream direction which means that the heat-transfer area in an upstream phase transition compartment is greater than the heat-transfer area in a subsequent downstream phase transition compartment. E.g. the heat-transfer area of the evaporating phase transition compartment IB1-IB2 is greater than the heat-transfer area of the subsequent downstream evaporating phase transition compartment IC1-IC2. The same applies to the heat-transfer areas in the deaerating casing shown in FIG. 14. From the heat-transfer areas of upstream work chambers being relatively greater follows that relatively lesser temperature differences are needed for the transfer of an equal amount of heat. Consequently, siphons of relatively lesser constructional height may be employed.

The number of functional units consisting each of a first, second and third casing is selected according to the required performance of an evaporator. As shown in FIG. 9, such units are, together with a pair of deaerating casings at the extremities of the evaporator, arranged between a front plate 164 and a back plate 166. Their mutual positions are fixed by in-and-out bolts one of which is designated by reference character 168.

The front plate 64 carries various pipe ends the functions of which can readily be interpreted on basis of their reference characters so that a detailed description thereof may be dispensed with.

It will now be apparent that the evaporator shown in FIGS. 9 to 14 is capable to perform all functions implied by the connection diagram according to FIG. 8. Moreover, it ensures an economic heating of the solution to be evaporated and a deaerating of vapours without an employment of voluminous receptacles, intricate pipings and various appliances. All that is replaced by four kinds of casings consisting of four kinds of spacers and three kinds of confining plates. Apart from extreme functional units which border on deaerating casings, any intermediate group consists of a first casing 100*b*-102*a*-100*a*, a second casing 100*a*-102*b*-100*b*, and a third casing 100*b*-102*c*-100*b* which can simply be produced in mechanized mass production. Obviously, the same applies to confining plates 100*c* and spacers 102*d* as well as, practically, to front plate 164 and back plate 166 of the deaerating casings 164-102*d*-100*d* and 100*b*-102*d*-166, respectively.

In operation, the solution to be evaporated is introduced via the passage 114 into the subdivided evaporating phase transition compartment IA1-IA2 of the first work chamber IA1-IA2-IIA. While flowing in the cooling passage 156 in the first casing /FIG. 11/ it exerts a cooling action on the common intermediate branches of the siphons 128A1, 128A2, 128B1 and 128B2 in the second casing /FIG. 12/ and warms up.

In the evaporating phase transition compartment IA1-IA2 the warmed up solution is evaporated by the heat of steam which flows in the passage 116 and becomes condensed in the third casing /FIG. 13/.

Vapours of the solution withdrawn through the passages 118A1 and 118A2, are demisted in the vortex chambers 142A1 and 142A2, and are exhausted through the orifices 106A1 and 106A2, respectively, into the condensing phase transition compartment IIA /FIG. 13/.

The partly evaporated solution withdraws via the siphons 128A1 and 128A2 into the evaporating phase transition compartment IB1-IB2 of the second work chamber IB1-IB2-IIB. While flowing in the common intermediate branches of the siphons 128A1 and 128A2 /FIG. 12/ it warms up the solution to be evaporated flowing in the cooling passage 156 through the first common confining plate 100*a*.

In the evaporating phase transition compartment IB1-IB2 a further evaporation takes place caused by the condensation heat released in the condensing phase transition compartment IIA of the first work chamber IA1-IA2-IIA /FIG. 13/ and transferred through the common second confining plate 100*b*.

The vapours formed in the evaporating phase transition compartment IB1-IB2 of the second work chamber IB1-IB2-IIB are exhausted into and condensed in the condensing phase transition compartment IIB of the latter /FIG. 13/. Their condensation heat is transferred to the evaporating phase transition compartment IC1-IC2 of the third work chamber IC1-IC2-IIC in the manner described in connection with the first work chamber IA1-IA2-IIA.

Vapours formed in the evaporating phase transition compartment IC1-IC2 are condensed in the condensing phase transition compartment IIC. Their condensation heat is abducted by cooling water flowing in the cooling passages 122a and 122b of the first and second casings, respectively /FIGS. 11 and 12/.

The concentrate and the distillate resulting from the evaporation of the solution to be evaporated withdraw from the evaporating phase transition compartment IC1-IC2 via the passage 120C and from the condensing phase transition compartment IIC via the passage 124C, respectively.

Air and other gases segregating in the passage 116 of the third casing /FIG. 13/ /actually a condensing phase transition compartment for the heating steam/ flow through the throttle orifices 132 in the second confining plates 100b into the deaerating passage 126 and herefrom into the deaerating compartment 162 of the deaerating casing /FIG. 14/. In a similar manner, air and other gases withdraw from the condensing phase transition compartments IIA, IIB and IIC via the throttle orifices 132A, 132B and 132C, and the deaerating passages 126A, 126B and 126C into the deaerating compartments 162A, 162B and 162C, respectively.

The deaerating compartments 162, 162A, 162B and 162C being interconnected by further throttle orifices 132, 132A and 132B enriched air and other gases are collectively exhausted from the deaerating casing /FIG. 14/ through the deaerating passage 126.

It will be apparent from FIGS. 11 to 13 that, in addition to the evaporating phase transition compartments of each work chamber opening directly into their associated condensing phase transition compartments also all phase transition compartments of the same stage are interconnected through the orifices 106A1, 106A2, 106B1, 106B2, 106C1 and 106C2 in the common first and second confining plates 100a and 100b, respectively. This means that the pressures prevailing in such parallel connected casings are the same for each stage.

For the purpose of cleaning only the bolts 168 have to be loosened in which case the confining plates can already be distanced from the spacers and rendered accessible. By removing the bolts 168 the whole apparatus can entirely be disassembled.

MULTI-FLASH EVAPORATORS IN PRINCIPLE

It will now be shown how heat-engineering apparatus according to the invention can be realized as multi-flash evaporators.

As is known, multi-flash evaporators differ from multi-effect evaporators essentially by that evaporation is effected by pressure reduction /adiabatically/ rather than by heat transmission /isothermally/. With multi-flash evaporation a solution to be evaporated is, prior to evaporation, used for the cooling of compartments where condensation takes place. After evaporation by means of pressure reduction and practically without heating the evaporated solution is either reintroduced into the system for recycling or else partly or wholly replaced by new amounts of fresh liquid.

Figure 15:
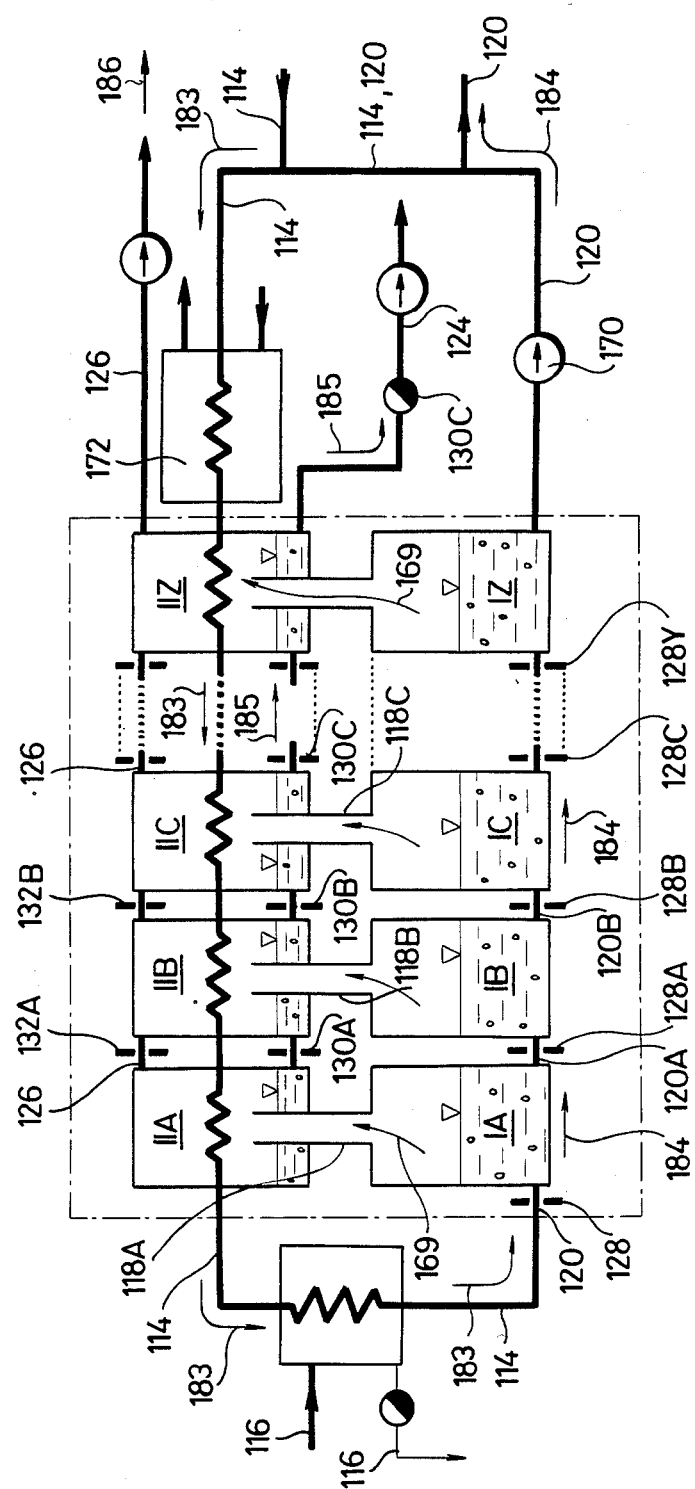
FIG. 15 represents a connection diagram of a multi-flash evaporator of conventional design.

FIG. 15 shows a connection diagram of a conventional multi-flash evaporator of generally horizontal layout. As reflected by reference characters applied to details of FIG. 15, most of its features have been explained in connection with FIG. 8 and need no further description.

On the other hand, an additional feature is a passage 114, 120 which connects the passage 114 for introducing a solution to be evaporated and the passage 120 for abducting the concentrate resulting from evaporation, and serves for the above mentioned recycling of already evaporated solution.

A further additional feature is a pump 170 which generates the pressure needed for circulating and/or recirculating the solution. The latter delivers its heat in a heat exchanger 172.

Conventional multi-flash evaporators built in compliance with the connection diagram according to FIG. 15 are again intricate structures comprising pipe conduits, separate evaporating chambers, condensers with pipe bundles, demisters and extensive vessels for locating such units. Thus, they are unsuitable for mechanized mass production as was the case with conventional multi-effect evaporators.

A HORIZONTAL MULTI-FLASH EVAPORATOR COMPOSED OF CASINGS

In contradistinction, FIGS. 16a, 16b, 17a, 17b and 18 to 29 show how multi-flash evaporators working in the manner of the connection diagram according to FIG. 15 can be built up of casings in compliance with the present invention so as to be suitable for mechanized mass production.

There is again a plurality of work chambers IA-IIA, ..., IZ-IIZ comprising each an adiabatically evaporating phase transition compartment IA, ..., IZ and a condensing phase transition compartment IIA, ..., IIZ. The former are separated from one another by pressure reducing means such as throttle orifices 128A, ..., 128Y.

Pairs of associated phase transition compartments of each work chamber are, in the instant case, arranged above one another in casings which, in turn, are abutted against one another flatwise and, thus, permit the building of evaporators of relatively small constructional height.

Figure 16A:
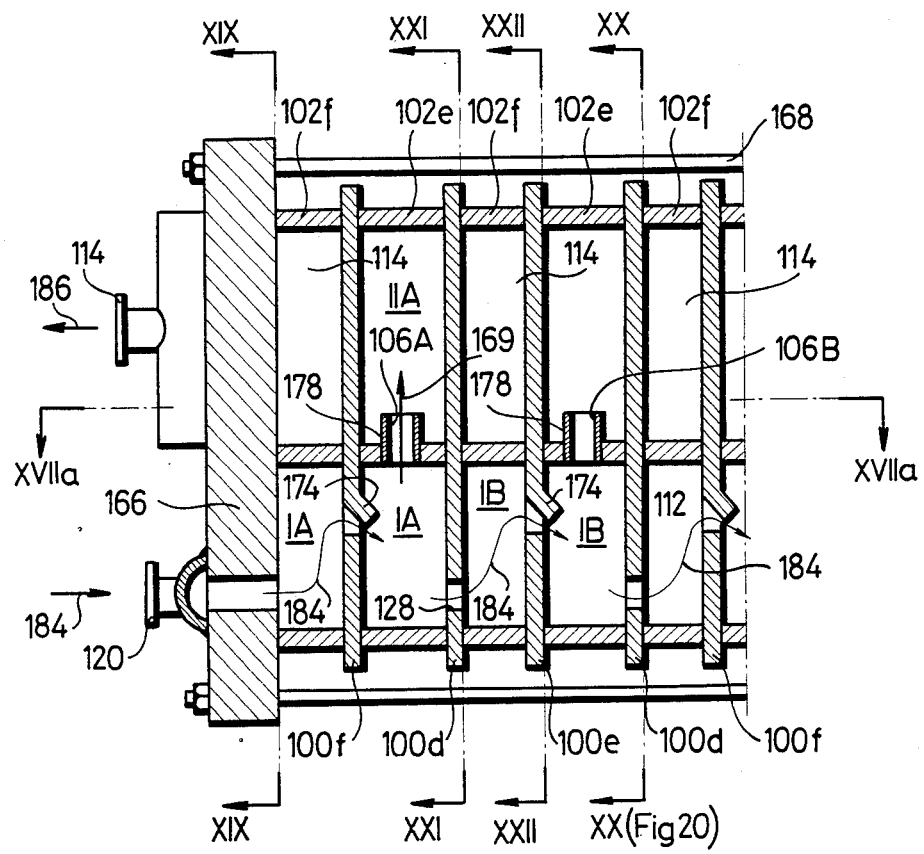
Figure 16B:
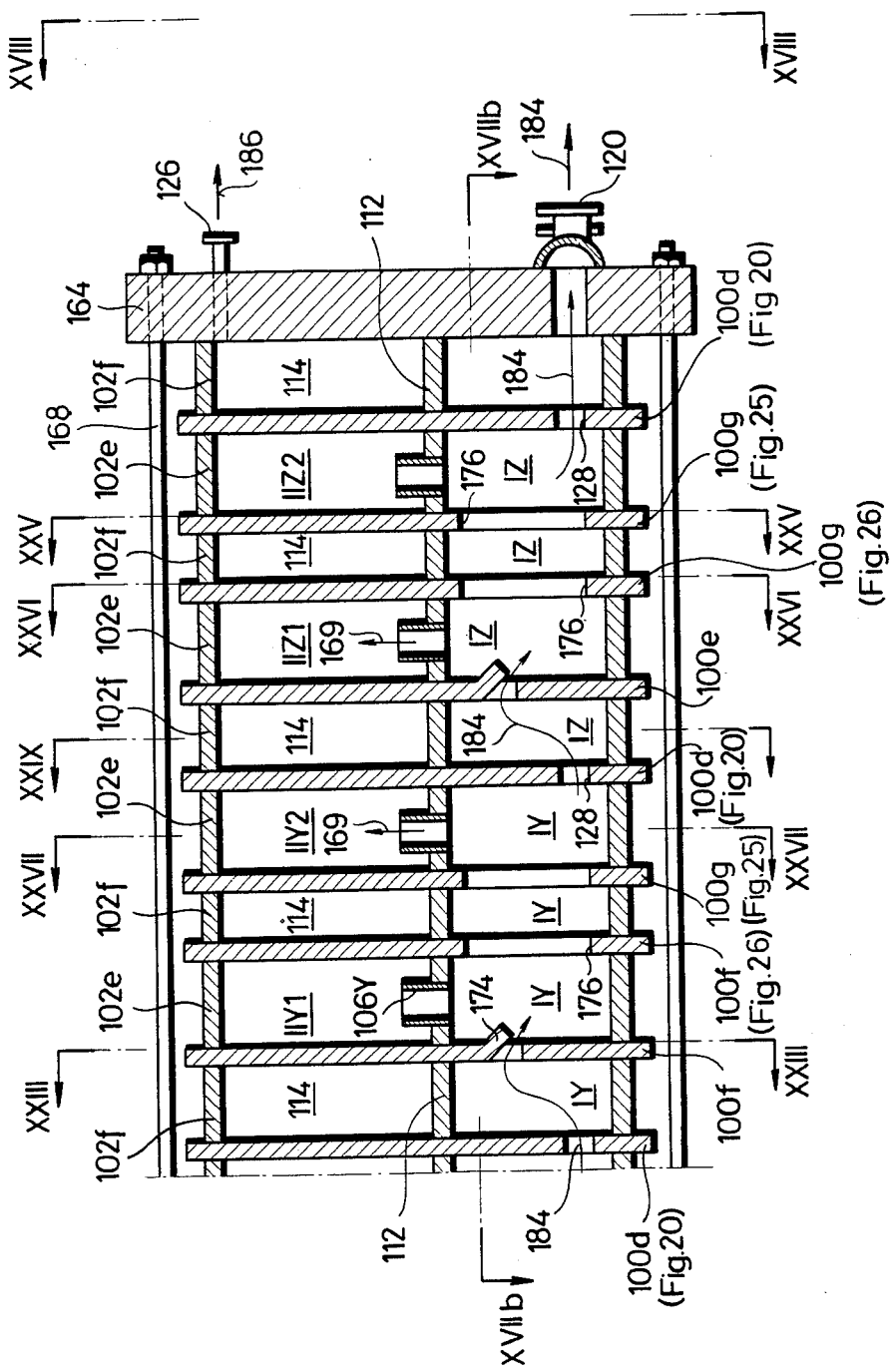
FIG. 16b is a sectional view taken along line XVIb—XVIb of FIG. 17b.

The casings are built up of altogether four kinds of confining plates 100d, 100e, 100f and 100g, and two kinds of spacers 102e and 102f which are shown individually in FIGS. 20 to 29 where they are viewed from line XVIII—XVIII in FIG. 16b.

FIGS. 18 and 19 show a front plate 164 and a back plate 166, respectively, which sandwich a plurality of casings and do not need commentary.

Figure 21:
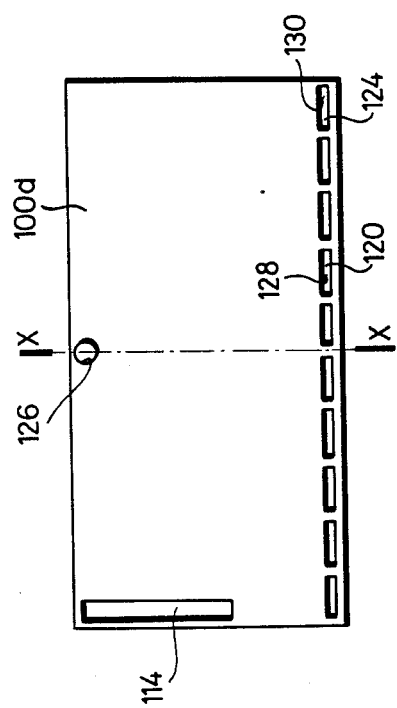

FIGS. 20 and 21 represent the same confining plate 100d in positions angularly displaced by 180 degrees around an axis X—X in the plane of the drawing.

Figure 22:
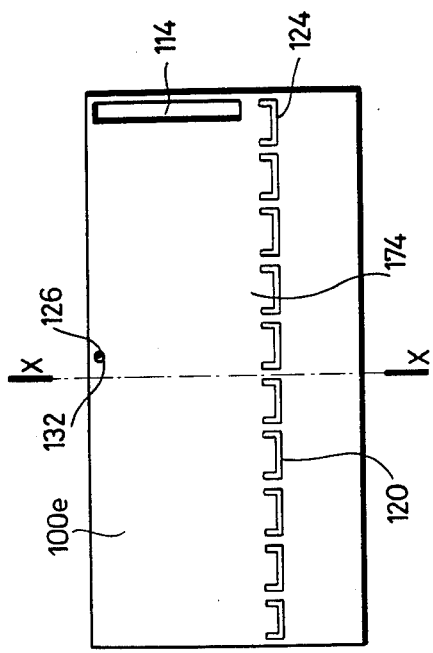
Figure 23:
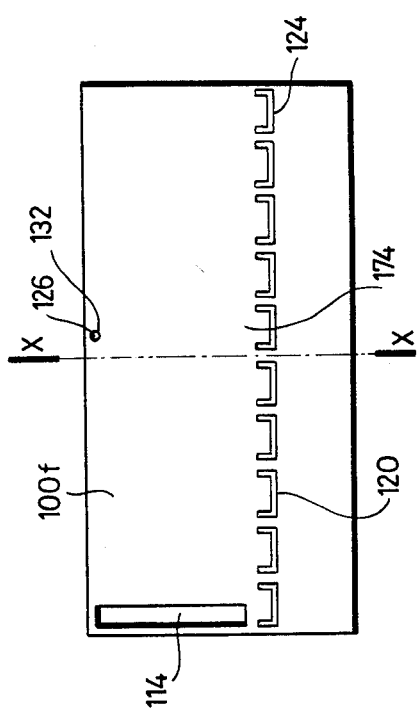
FIG. 23 is an elevational view taken along line XXIII—XXIII of FIG. 16b.
Figure 24:
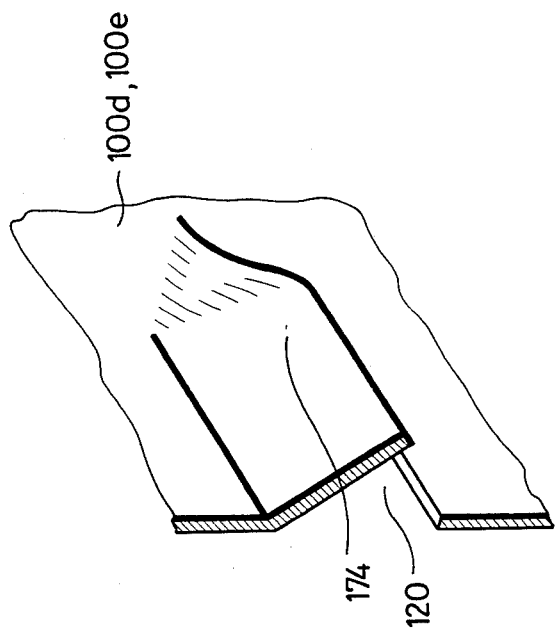
FIG. 24 shows a perspective view of a detail of FIGS. 22 and 23.

FIGS. 22 and 23 illustrate the confining plate 100e and 100f, respectively, with ears 174 axonometrically represented in FIG. 24. Axes X—X are represented to show excentric positions of throttle orifices 132.

Figure 25:
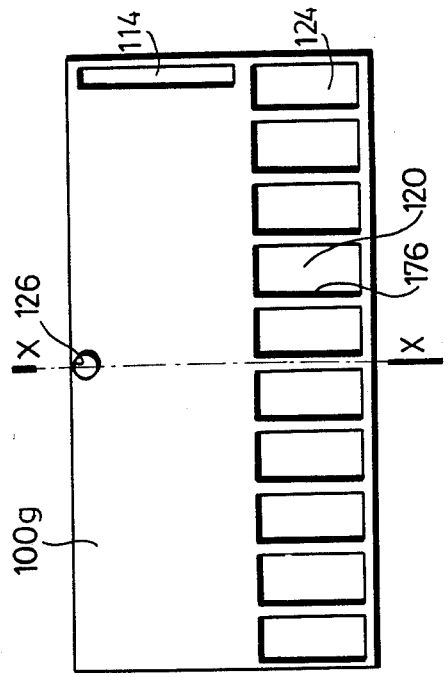
FIG. 25 represents an elevational view taken along line XXV—XXV of FIG. 16b.
Figure 26:
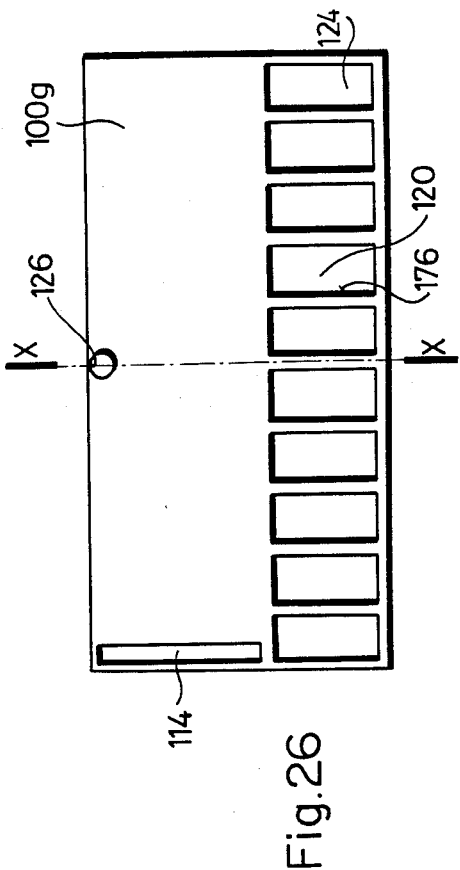
FIG. 26 illustrates an elevational view taken along line XXVI—XXVI of FIG. 16b.

FIGS. 25 and 26 represent the same confining plate 100g likewise in positions angularly displaced by 180 degrees around an axis X—X in the plane of the drawing. They are distinguished from the confining plates 100d by relatively large orifices 176.

FIG. 27 shows the spacer 102e. Its enclosure is subdivided by a first and, in the instant case, horizontal partition 112 into a lower adiabatically evaporating phase transition compartment I and an upper condensing phase transition compartment II /see also FIG. 4/. As illustrated in FIG. 28, the partition 112 has stubs fixed to it through which both phase transition compartments I and II open directly into one another as required by one of the main features of the present invention. Thus, the bores of the stubs 178 perform the function of the orifices 106 /see FIG. 1/ and are, therefore, designated by the same reference character. The stubs 178 prevent a backflow of distillate through the orifices 106. Extensions 158a and 158b serve for delimiting pre-deaerating niches or bays 160 within the condensing phase transition compartment II.

A second partition 182 transverse of first partition 112 occupies, in the instant case, a vertical position and delimits the adiabatically evaporating phase transition compartment I against a distillate conducting passage 124 which communicates with the condensing phase transition compartment II and registers with the extreme right orifice 176 of the confining plate 100g /FIGS. 25 and 26/ as regards the drawing. As will be seen, the significance of such expedient consists in that the distillate can be abducted collectively from the condensing phase transition compartments I as was the case with the previous exemplified embodiment where the distillate was likewise conducted in cavities of spacers and orifices of confining plates.

Finally, FIG. 29 represents the spacer 102f with first and second partitions 114 and 182, respectively, which serve to form passages of various media as reflected by reference characters 114 and 124.

The spacers 102e and 102f are alternately located between the front plate 164 and the back plate 166, and are separated from one another by common confining plates so as to form adjacent casings as shown in FIGS. 16a, 16b, 17a and 17b. Since confining plates 100d and 100g are inserted in alternate positions shown in FIGS. 20, 21 and 25, 26, respectively, in FIGS. 16a, 16b, 17a and 17b a reference to the respective Figure is given in brackets beneath the reference character of such confining plates in order to indicate their positions and, thereby, to facilitate mental reconstruction of the apparatus on basis of the drawing.

In the instant case, two sorts of groupings can be distinguished.

Figure 17A:
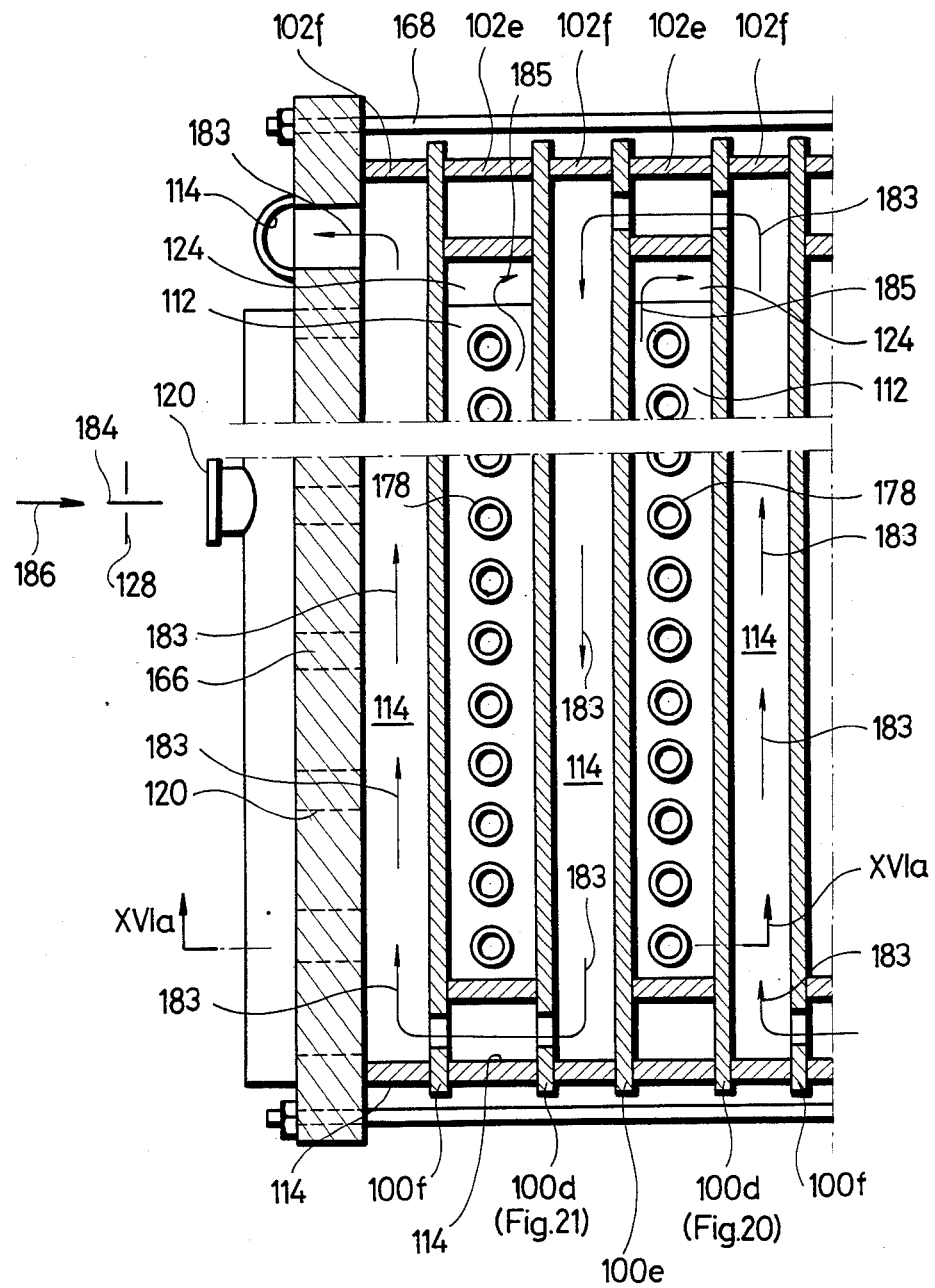
Figure 17B:
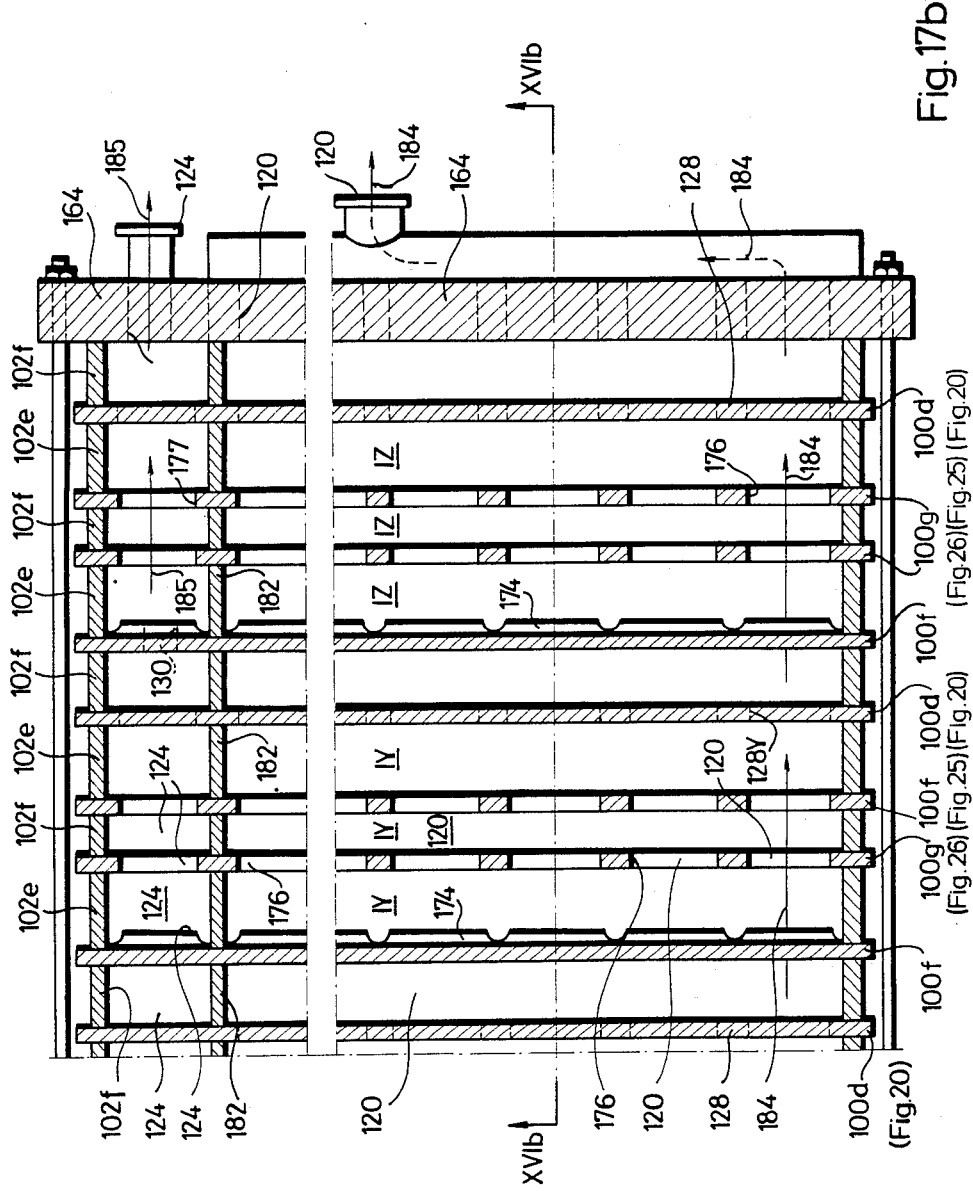
FIG. 17b represents a sectional view taken along line XVIIb—XVIIb of FIG. 16b.

In the portion of the evaporator illustrated in FIGS. 16a and 17a confining plates 100d alternate with confining plates 100f and 100e sandwiching spacers 102e and 102f, while in the evaporator portion represented in FIGS. 16b and 17b confining plates 100f, a pair of confining plates 100g and confining plates 100d form a group likewise with alternately inserted spacers 102e and 102f.

Consequently, in FIGS. 16a and 17a each adiabatically evaporating phase transition compartment IA and IB is associated but with a single condensing phase transition compartment IIA and IIB, respectively, while in FIGS. 16b and 17b the adiabatically evaporating phase transition compartments IY and IZ are associated each with a pair of condensing phase transition subcompartments IIY1 and IIY2 respectively IIZ1 and IIZ2. Thus, the heat-transfer areas in the condensing phase transition compartments IIY1-IIY2 and IIZ1-IIZ2 of the downstream work chambers IY-IIY1-IIY2 and IZ-IIZ1-IIZ2 are twice as great as the heat-transfer areas in the condensing phase transition compartments IIA and IIB of upstream work chambers IA-IIA and IB-IIB, respectively. In other words, the heat-transfer areas of the condensing phase transition compartments of work chambers increase in downstream direction in that the heat-transfer area of the condensing phase transition compartment of an upstream work chamber is smaller than the heat-transfer area of the condensing phase transition compartment of a downstream work chamber. Such association of an adiabatically evaporating phase transition compartment with a plurality of condensing phase transition subcompartments permits to employ relatively lower condensing phase transition compartments because, as is known per se, adiabatically evaporating phase transition compartments are, for thermo-dynamical reasons, relatively large which, in turn, would require large heat-transfer areas in associated condensing phase transition compartments. By the above described subdivision of the latter such difficulties are suitably eliminated.

Furthermore, it is seen that adiabatically evaporating phase transition compartments of adjacent work chambers such as IA-IIA and IB-IIB /FIG. 16a/ together with a throttle orifice at the lower extremity of their common confining plates 100d /FIGS. 20 and 21/ that is at a possibly low level form siphons which function as pressure reducing means therebetween. The siphon between the adiabatically evaporating compartments IA and IB of the first and second work chambers IA-IIA and IB-IIB, respectively, may be referred to by composite reference character IA-128-IB. The advantage of the employment of such siphons consists in that the vapours cannot escape through the ears 174 by which the efficiency of the apparatus would be jeopardized. Instead, they are forced to pass the orifices 106A, etc.

Passage 114 conveying the solution to be evaporated has a sinuous configuration as can particularly be seen from FIG. 17a so as to sweep the whole extension of condensing phase transition subcompartments IIZ2, IIZ1, IIY2, IIY1, ..., and condensing phase transition compartments IIB and IIA. In other words, the condensing phase transition compartments and subcompartments are, along their whole extension, contacted by the passage 114 which conveys the solution to be evaporated so that the cooling capability of the latter is exploited as far as practically possible.

Deaerating passages 126 and throttle orifices 132 will also be recognized in various parts of the exemplified embodiment and interpreted on basis e.g. of FIG. 8.

In operation, the exemplified multi-flash evaporator performs the functions inherent to the connection diagram of FIG. 15 which, in turn, can be interpreted on basis of FIG. 8.

The solution to be evaporated is introduced via the passage 114 /FIG. 18/, flows along its sinuous path as indicated by arrows 183, enters the passage 120, traverses the adiabatically evaporating phase transition compartments IA, IB, ..., IY, IZ /FIGS. 16a and 16b/ and withdraws in the form of a concentrate as indicated by arrows 184.

Vapours pass from adiabatically evaporating compartments through the orifices 106A, etc. into their associated condensing phase transition compartments and subcompartments IIA, IIB, ..., IIY1, IIY2, IIZ1 and IIZ2, respectively, as indicated by arrows 169 where they become condensed due to the cooling action of the solution flowing in the passage 114. Condensed vapours are collected in and abducted in the form of a distillate by the passage 124 /FIG. 17b/ as indicated by arrows 185.

Air and gases segregating in the condensing phase transition compartments are abducted by passages 126 and throttle orifices 132, and collectively exhausted as indicated by arrow 186 in FIG. 16b.

ANOTHER HORIZONTAL MULTI-FLASH EVAPORATOR COMPOSED OF CASINGS

Figure 30:
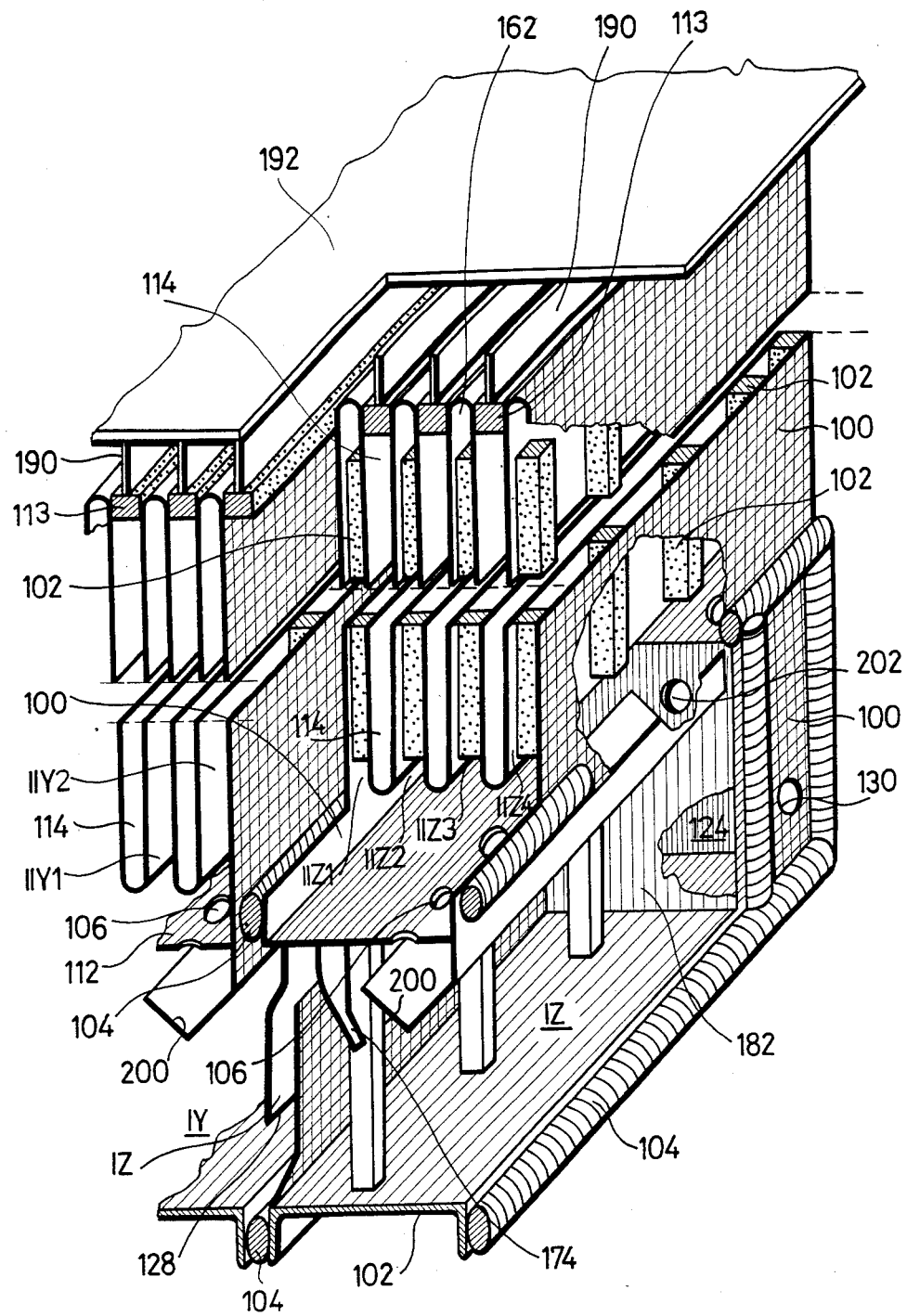
FIG. 30 illustrates a detail of an other exemplified embodiment of the invention in a sectional perspective view.

While the previous embodiment consisted of casings of the type shown in FIG. 1, FIG. 30 illustrates an exemplified embodiment the casings of which belong to the type illustrated in FIG. 5.

Adiabatically evaporating phase transition compartments IY and IZ are again associated each with a plurality of condensing phase transition subcompartments IIY1, IIY2 and IIZ1, IIZ2, IIZ3, IIZ4, respectively, which enclose passages 114 for conducting a solution to be evaporated as was the case with the previous embodiment /FIG. 16b/. Here, however, the passages 114 are sealed towards the ambiency by packings 113 /FIG. 5/ which are carried by a removable lid 192 by means of webs 190. Fixing the removable lid 192 may be carried out in any convenient manner e.g. by means of bolts.

Other features of the previous exemplified embodiments such as the horizontal partition 112 with orifices 106 for the passage of vapours between associated compartments, the vertical partition 182, the distaillate conducting passage 124 therebehind and its throttle orifice 130 are likewise recognizable.

A new feature consists in the employment of a distillate conducting trough 200 beneath the orifices 106 in each adiabatically evaporating phase transition compartment IY and IZ leading to a distillate discharging orifice 202 in the vertical partition 182 at the downstream end of trough 200. The advantage of such construction lies in the dispensability of the stubs 178 of the previously described embodiment which permits an extended employment of sheet technology and, thus, furthers the possibility of mechanized mass production.

In operation, the distillate originating from condensation of vapours e.g. in the condensing phase transition subcompartments IIZ1, IIZ2, IIZ3 and IIZ4 trickles through their associated orifices 106 into the trough 200 and flows from there through the discharging orifice 202 into the distillate conducting passage 124 from which it withdraws in the manner already described in connection with the previous embodiment. Otherwise, the operation is the same as was there what is easily recognized on basis of the system of reference characters.

Deaerating may be carried out essentially as has been described hereinbefore. Its details, however, are, for sake for clarity, not shown safe a deaerating compartment 162.

Whenever the passages 114 have to be cleansed, the lid 192 with the packings 113 is removed whereupon the passages become readily accessible from above without the apparatus itself being disassembled. After cleansing the lid 192 is put back into its position shown in FIG. 30 and fixed. Then the passages 114 are again sealed towards the ambiency by the packings 113 and the evaporator is anew ready for operation.

VERTICAL MULTI-FLASH EVAPORATORS IN PRINCIPLE

As a rule, vertical multi-flash evaporators are used when there is but limited ground-space at disposal.

Figure 31:
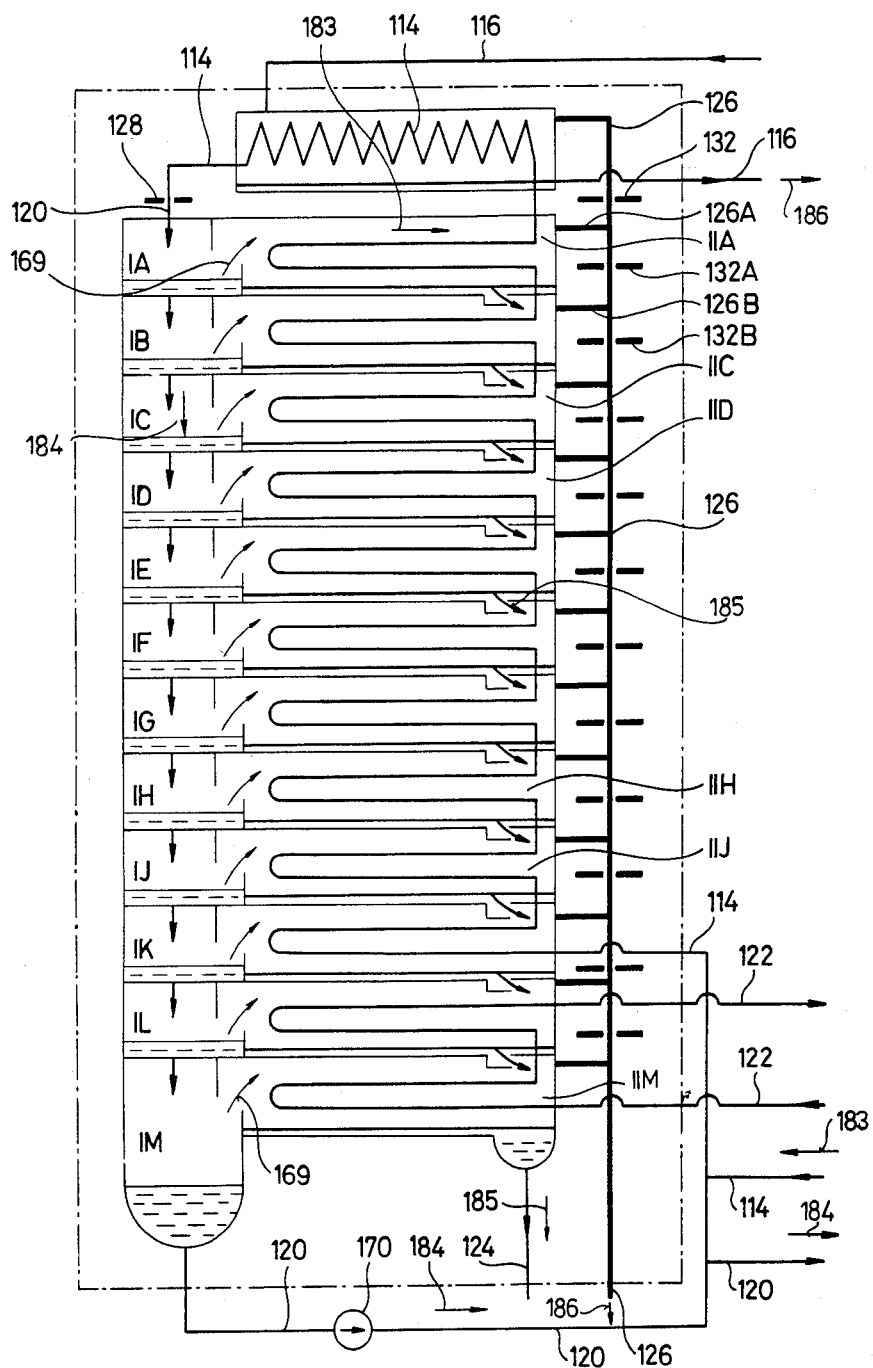
FIG. 31 is the connection diagram of an other multi-flash evaporator embodying the invention.

FIG. 31 shows a conventional connection diagram of such vertical layout with twelve stages or work chambers IA-IIA, ..., IM-IIM. Other details of the connection diagram are readily recognized by reference characters applied thereto which refer back to the connection diagrams illustrated in FIGS. 8 and 15, respectively, and, thus, do not need detailed description.

A VERTICAL MULTI-FLASH EVAPORATOR COMPOSED OF CASINGS

FIGS. 32 to 36 represent an exemplified embodiment of the invention in the form of a vertical multi-flash evaporator which is built up in compliance with what is delimited by dash-and-dot lines in the connection diagram of FIG. 31.

Figure 32:
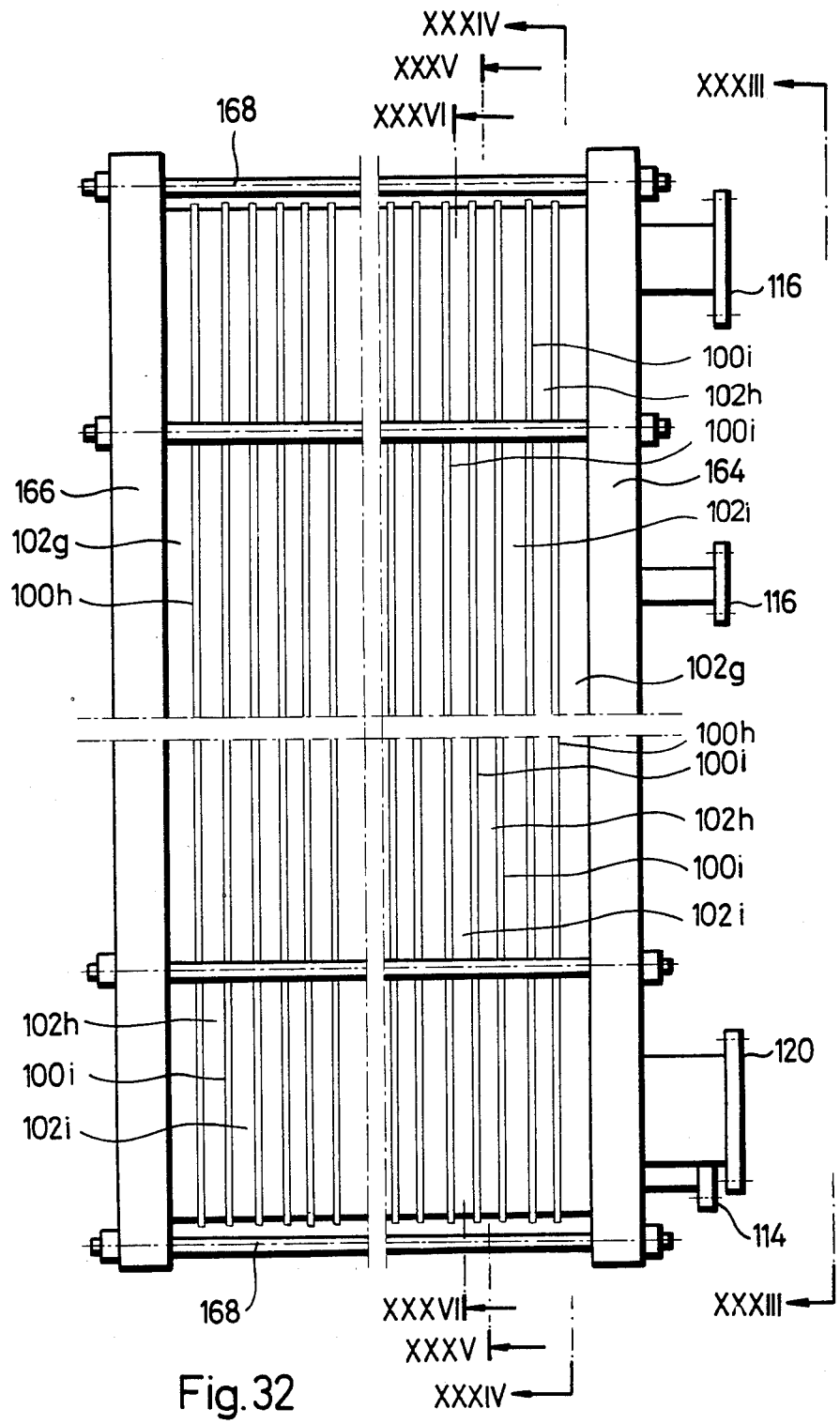
FIG. 32 shows a side-elevational view of the multi-flash evaporator embodying the connection diagram illustrated in FIG. 31.
Figure 33:
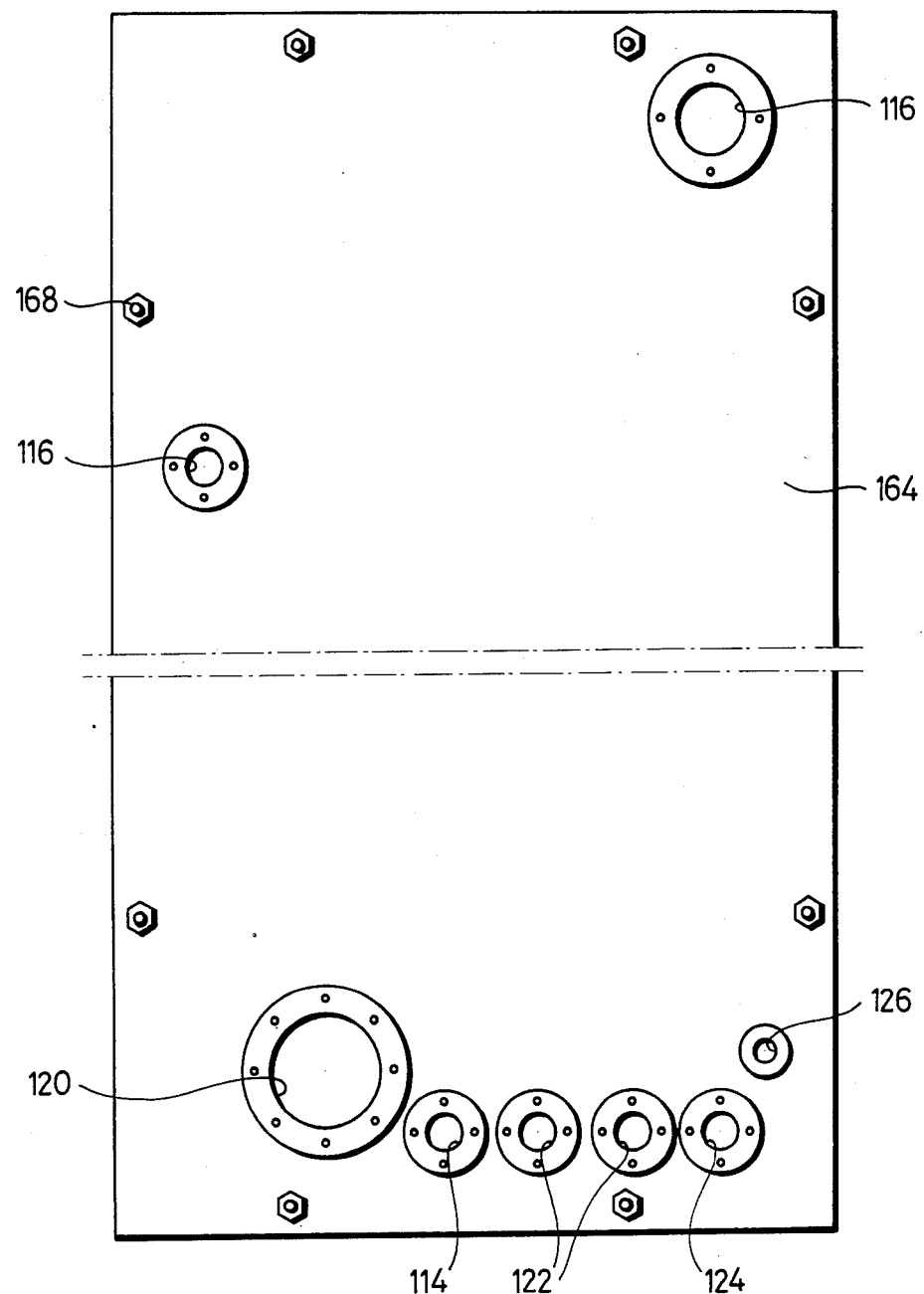
FIG. 33 represents a front-elevational view taken along line XXXIII—XXXIII of FIG. 32.

The side-elevational view in FIG. 32 shows the general arrangement of adjacent casings which are sandwiched flatwise by a front plate 164 and a back plate 166.

Figure 34:
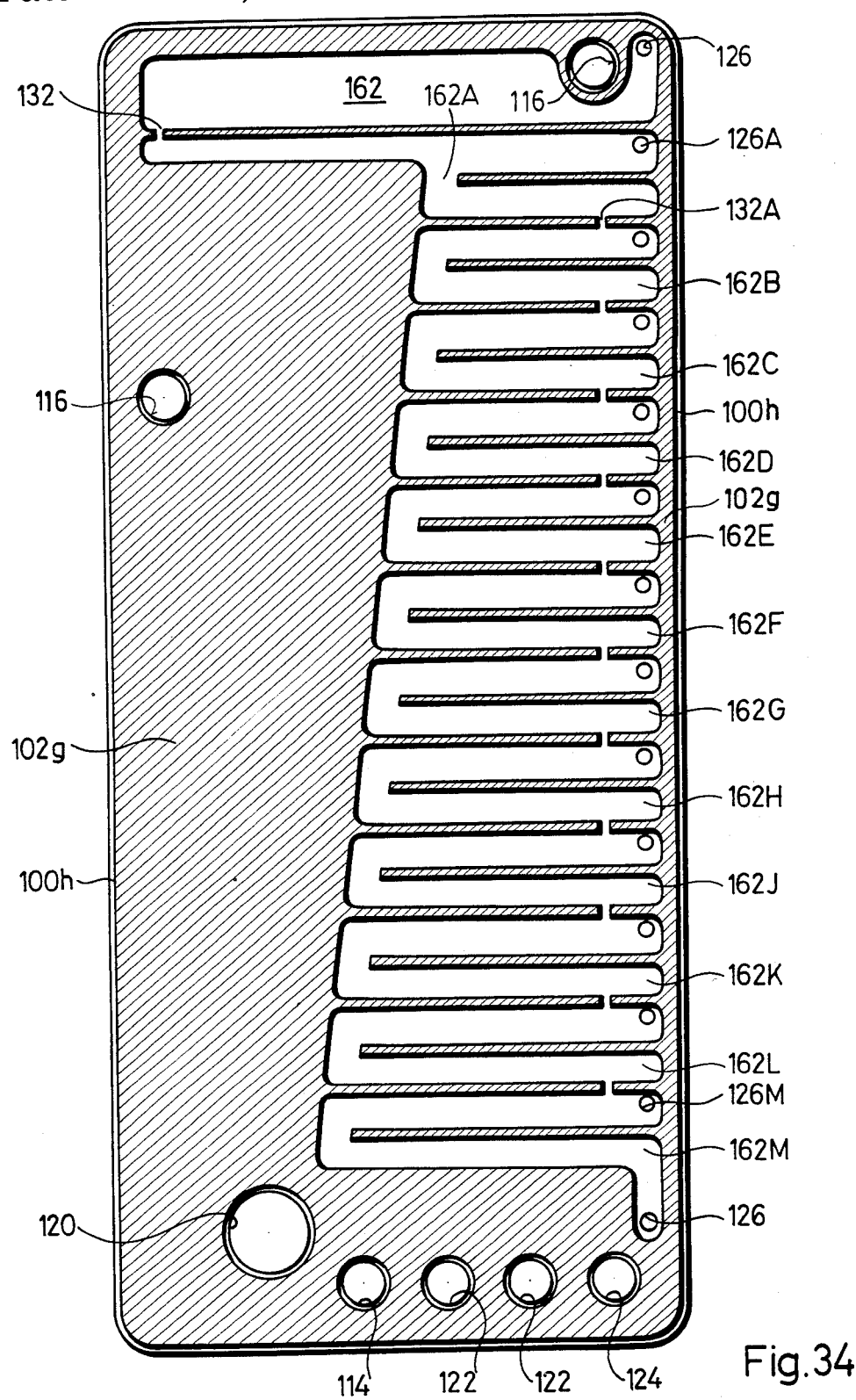
FIG. 34 illustrates a sectional view taken along line XXXIV—XXXIV of FIG. 32.

At each of the extremities of the apparatus there is a deaerating casing with a spacer 102g illustrated in FIG. 34 details of which will be easily recognized by a comparison with the deaerating casing shown in FIG. 14 as well as by the system of employed reference characters. The inward sides of the deaerating casing are constituted each by a confining plate 100h.

Figure 35:
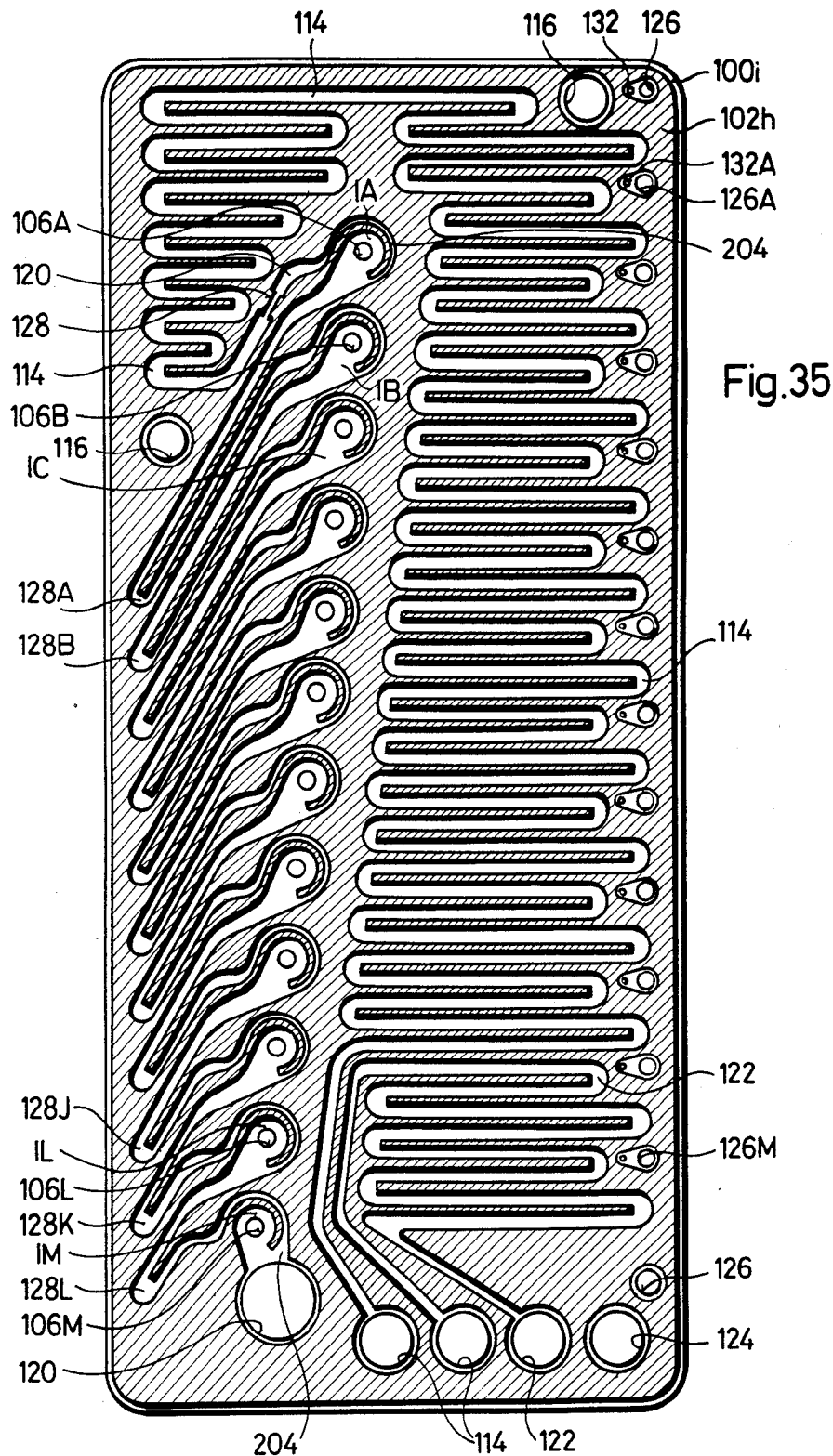
FIG. 35 is a sectional view taken along line XXXV—XXXV of FIG. 32.
Figure 36:
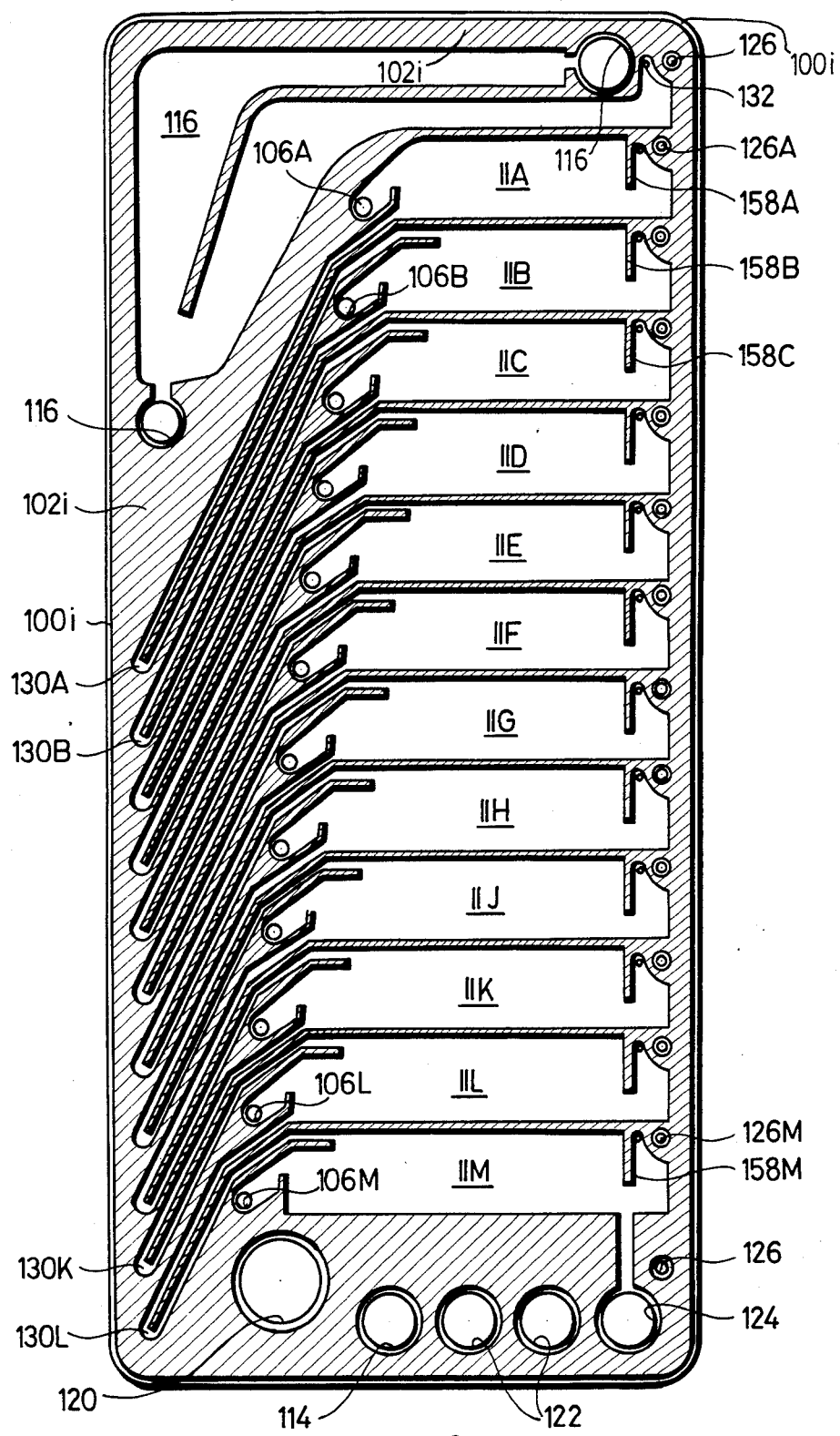
FIG. 36 shows a sectional view taken along line XXXVI—XXXVI of FIG. 32.

Between both deaerating casings there is a series of alternately arranged first and second work casings with common confining plates 100i and spacers 102h and 102i shown in FIGS. 35 and 36, respectively.

Thus, the casings of the instant embodiment are built up of altogether two kinds of confining plates 100h and 100i, and three kinds of spacers 102g, 102h and 102i. Any intermediate pair of work casings 100i-102h-100i and 100i-102i-100i form a functional unit.

It is seen that the aforesaid first and second casings comprise each a plurality of phase transition compartments of the same function arranged above one another. In particular, a first work casing shown in FIG. 35 encloses a plurality of adiabatically evaporating phase transition compartments IA, IB, ..., IL, IM while a second work casing shown in FIG. 36 houses a plurality of condensing phase transition compartments IIA, IIB, ..., IIL, IIM. Thus, a pair of adjacent casings comprises a whole series of complete work chambers IA-IIA, IB-IIB, ..., IL-IIL, IM-IIM. Such arrangement ensures a suitable separation of a concentrate from a distillate.

The adiabatically evaporating phase transition compartments IA, IB, ..., IL, IM are, in the instant case, formed as vortex chambers which open through orifices 106A, 106B, ..., 106L, 106M of a common confining plate 100i at the centers of the former directly into associated condensing phase transition compartments IIA, IIB, ..., IIL, IIM, respectively, again as required by one of the main features of the invention, so as to connect pairwise an adiabatically evaporating phase transition compartment such as compartment IA with a condensing phase transition compartment such as IIA of the same work chamber such as work chamber IA-IIA.

Figure 35A:
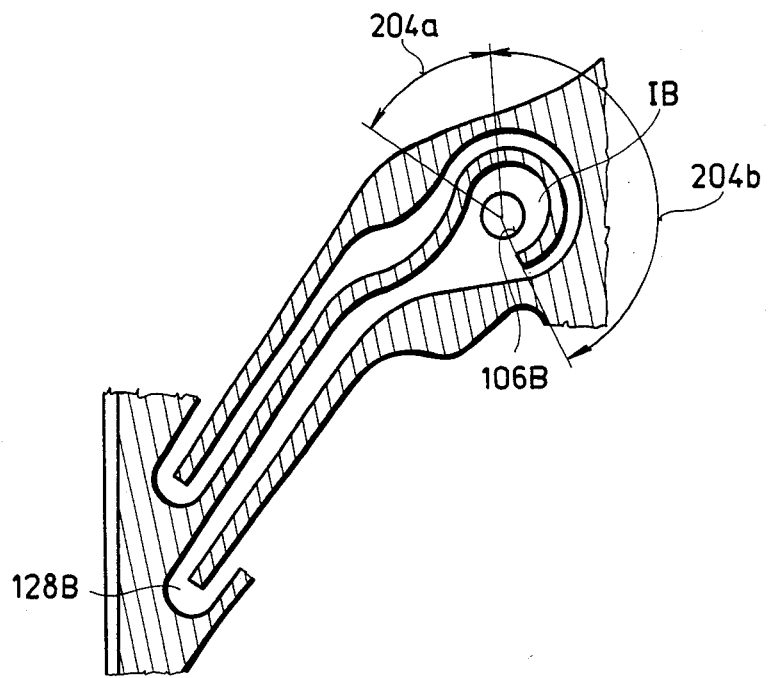
FIG. 35a being a detail thereof at an enlarged scale.

Likewise in the instant case, as shown in details in FIG. 35a, upstream the vortex chamber there are curved nozzles 204 which comprise each an initial section 204a of contracting cross-sectional area and a final section 204b of expanding cross-sectional area. It is to be noted that nozzles 204 are the subject matter of Hungarian Pat. No. 156,428 so that further details thereof may be learned from the respective specification if necessary. With special regard to the present invention their significance consists in that they represent small size cyclones which can easily be formed by spacers and ensure a suitable segregation of liquid droplets as is known from the theory of demisting by means of cyclones.

Like in the previously described exemplified embodiments, the work chambers IA-IIA, IB-IIB, . . . , IL-IIL, IM-IIM are separated from one another by means of siphons the advantage of which has been explained in connection with the multi-effect evaporator shown in FIGS. 9 to 14.

In the instant case, the adiabatically evaporating phase transition compartments IA, IB, . . . , IL, IM and the condensing phase transition compartments IIA, IIB, . . . , IIL, IIM are interconnected by first siphons 128A, 128B, . . . , 128L and second siphons 130A, 130B, . . . , 130L, respectively.

Moreover, the siphons are located in such a manner that the first siphons are pairwise in heat-transfer relationship with the second siphons through the common confining plate 100*i* of a pair of adjacent casings. For instance, siphon 128B which interconnects the adiabatically evaporating phase transition compartment IB of work chamber IB-IIB /which is a down-stream work chamber as regards work chamber IA-IIA, and an upstream work chamber as regards work chamber IC-IIC/ with the adiabatically evaporating phase transition compartment IC of the work chamber IC-IIC /which is a downstream work chamber as regards work chamber IB-IIB, and an upstream work chamber as regards work chamber ID-IID/ is in heat-transfer relationship with siphon 130A which interconnects the condensing phase transition compartment IIA of work chamber IA-IIA and the condensing phase transition compartment IIB of work chamber IB-IIB. Obviously, siphon 128A which is the first member of the series of first siphons, and siphon 130L which is the last member of the series of second siphons stay out from such heat-transfer relationship.

However, of the other siphons of both series it is valid that first siphons interconnecting the adiabatically evaporating phase transition compartments of a pair of downstream work chambers /e.g. work chambers IB-IIB and IC-IIC/ are in heat-transfer relationship with the second siphons interconnecting the condensing phase transition compartments of a pair of upstream work chambers /e.g. work chambers IA-IIA and IB-IIB/ through a common confining plate 100*i* between a pair of adjacent casings 100*i*-102*h*-100*i* and 100*i*-102*i*-100*i*, respectively.

Thus, the first siphons 128B, . . . , 128L which convey a solution to be evaporated of decreased temperature due to evaporation have a cooling effect on the second siphons 130A, . . . , 130K and prevent an evaporation in the latter. Experimental evidence shows that by such cooling the amount of distillate will increase by 5% with respect to conventional multi-flash evaporators with which the exploitation of a like thermo-dynamical advantage is omitted because of intricate machinery. In contrast, casings according to the invention offer a relatively simple means for such purpose as has been shown.

A required manner of operation of the first siphons 128B, . . . , 128K which conduct the solution to be evaporated is ensured, on the other hand, by the employment of the nozzles 204 which counteract the effect of a slight cooling resulting from the above described heat-transfer relationship.

As is known, the pressure difference required for a unit change of saturation temperature is relatively greater in ranges of elevated temperatures. Thus, by decreasing the heat-transfer areas in upstream direction also the temperature drop per stage is decreased by which the pressure range needed for a reliable operation of the siphons may materially be increased and burstings avoided. Therefore, in the instant case, the heat-transfer areas associated with the work chambers IA-IIA, . . . , IM-IIM increase in downstream direction while the constructional height of both the first siphons 128A, . . . , 128L and the second siphons 130A, . . . , 130L decrease in subsequent downstream stages which means an allround diminution of the height of the apparatus.

In the instant case, the first casings 100*i*-102*h*-100*i* /FIG. 30/ comprise a supply passage 114 for conducting the solution to be evaporated and a cooling passage 122 for conducting a cooler medium such as water. Both passages 114 and 122 in the first casings are in heat-transfer relationship with the condensing phase transition compartments IIA, . . . , IIM in the second casings 100*i*-102*i*-100*i* /FIG. 36/ through common confining plates 100*i* therebetween.

Moreover, in the second casings 100*i*-102*i*-100*i* /FIG. 36/ comprising the condensing phase transition compartments IIA, . . . , IIM there is a heating passage 116 for conducting a heating medium such as steam. This heating passage 116 is in heat-transfer relationship with the top portion of the supply passage 114 in adjacent first casings /FIG. 35/ through common confining plates 100*i* therebetween.

In operation, the exemplified embodiment shown in FIGS. 32 to 36 works in the manner of conventional multi-flash evaporators inherent to the connection diagram of FIG. 31:

A solution to be evaporated flows in the supply passage 114 and receives, by turns, the condensation heat of vapours from the condensing phase transition compartments IIA, . . . , IIM and of the heating steam from passage 116. The warmed up solution is supplied through throttle orifice 128 into passage 120 and the first adiabatically evaporating phase transition compartment IA /FIG. 35/.

The solution evaporated in a first stage is introduced through siphon 128A into the adiabatically evaporating phase transition compartment IB of the subsequent downstream work chamber IB-IIB.

Vapours evaporated in the adiabatically evaporating phase transition compartment IA and demisted in the vortex chamber formed thereby flows through the orifice 106A over into the condensing phase transition compartment IIA of the first work chamber IA-IIA where they are condensed by the cooling action of the solution flowing in the passage 114.

A resulting condensate /distillate/ is introduced through siphon 130A into the next downstream condensing phase transition compartment IIB.

Similar performances take place in subsequent downstream work chambers IC-IIC, . . . , IL-IIL.

From the last work chamber IM-IIM the evaporated solution withdraws as concentrate via the passage 120 while condensed vapours are exhausted in the form of distillate via the distillate conducting passage 124.

Deaeration of condensing phase transition compartments IIA, . . . , IIM takes place as was the case e.g. with the multi-effect evaporator shown in FIGS. 9 to 14, and does not need further explanation.

A FURTHER VERTICAL MULTI-FLASH EVAPORATOR COMPOSED OF CASINGS

Figures 37, 38:
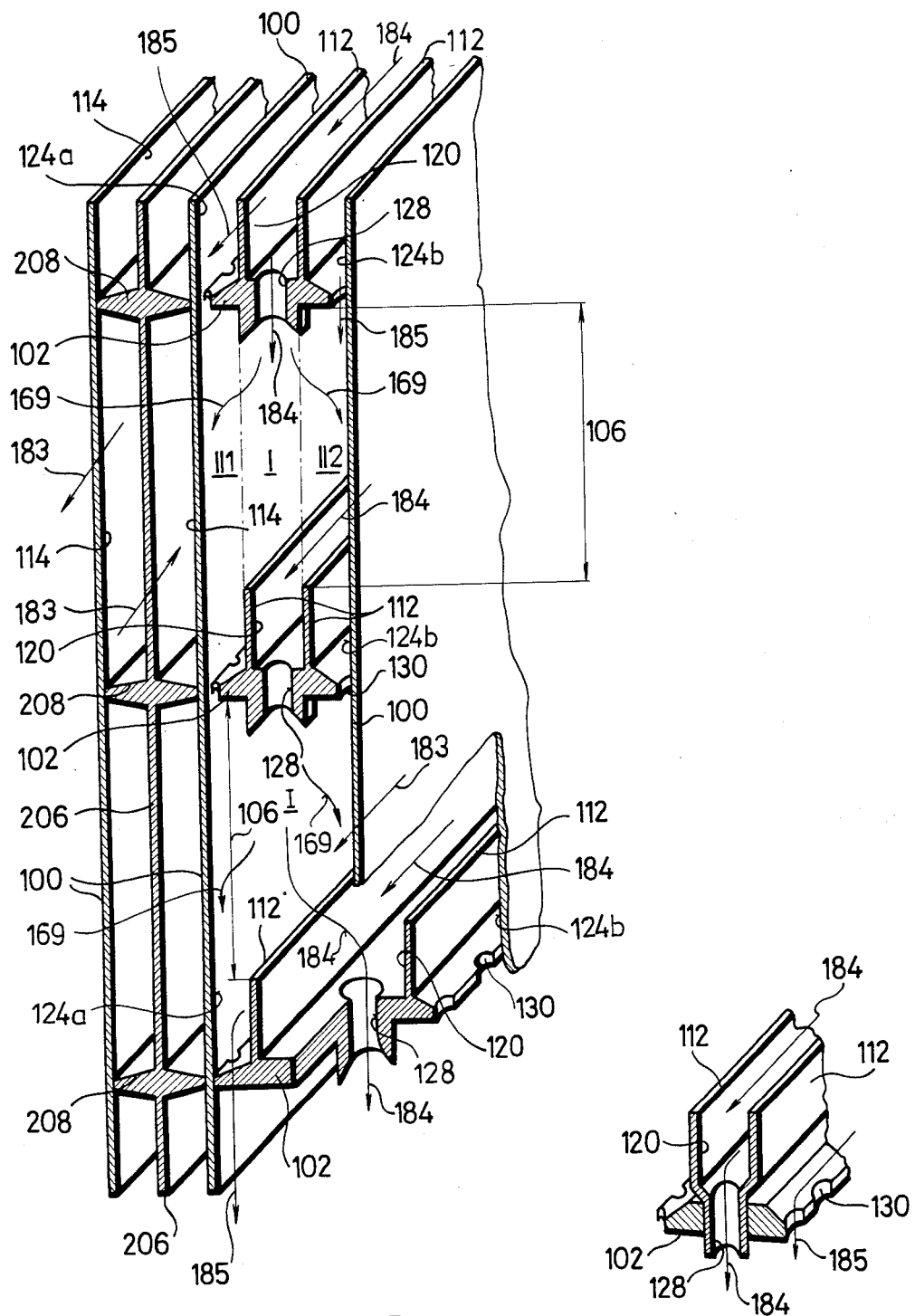
FIG. 37 represents a sectional perspective view of a still further exemplified embodiment of the invention.
FIG. 38 illustrates a modified form of a detail of FIG. 37 likewise in a sectional perspective view.

FIG. 37 shows a multi-flash evaporator designed in compliance with the principle explained in connection with FIG. 6. It means that here a plurality of complete work chambers are provided above one another in single casings.

Specifically, the space between a pair of confining plates 100 is vertically subdivided by spacers 102 which carry each a pair of parallel partitions 112. The latter delimit, on the one hand, with one another a passage 120 in the form of a channel for conducting a solution to be evaporated and, on the other hand, with the confining plates 100 a pair of passages 124a and 124b likewise in the form of channels for conveying a condensate of the vapours of the solution.

In the bottoms of these channels or, what is the same, in the spacers 102 there are throttle orifices 128 and 130 through which the solution to be evaporated and the condensate, respectively, are introduced from upstream passages 120 and 124a, 124b or channels into respective subsequent downstream passages or channels therebeneath. Since channels of the same function register with one another in vertical direction, they ensure a thorough separation of the distillate from the concentrate.

The throttle orifices 128 and 130 of one work chamber do not compulsorily register with the respective throttle orifices of a subsequent upstream or downstream work chamber as is apparent from the drawing.

The unimpeded passage between the upper edge of the partitions 112 and the bottom surface of the spacers 102 thereabove is designated by reference character 106 because—as will soon be seen—they perform the same function as the orifices 106 which directly connect associated phase transition compartments.

In the instant case, the condensing phase transition compartment of each work chamber is subdivided into subcompartments II1 and II2 which pairwise sandwich their associated adiabataically evaporating phase transition compartment I within the same casing 100-102-100 as suggested by dahs-and-dot lines in connection with the middle work chamber I-II1-II2 in FIG. 37.

On the sides of the confining plates 100 opposite to the work chamber I-II1-II2 the space between a pair of confining plates 100 is subdivided by a partition 206. This is, in the instant case, provided with shoulders 208 at level with the spacers 102 as illustrated on the left-hand side of FIG. 37. Passages between confining plates 100, partitions 206 and shoulders 208 may be used for conveying e.g. the solution to be evaporated prior to its entering the passage 120. Therefore, they are referred to by reference character 114. Alternately, they may conduct a cooling liquid such as water for a final stage as in case of passage 122 /FIG. 8/. Moreover, the shoulders 208 may be omitted and a cooling fluid circulated along vertical paths if more suitable for constructional or operational reasons as the case may be.

In operation, a solution to be evaporated is supplied via the passages 114 as has been described in connection with FIG. 17a that is along a sinuous path indicated by arrows 183. Therewhile it exerts a cooling action on the condensing phase transition subcompartments II1 and II2 through bordering confining plates 100. Eventually, it enters the passage 120 as indicated by arrows 184 /FIG. 17b/ in which it passes, by turns, from the adiabatically evaporating compartment of an upstream work chamber into a similar compartment of a subsequent downstream work chamber such as work chamber I-II1-II2 through throttle orifices 128. Evaporation in the adiabatically evaporating phase transition compartment I is indicated by arrows 169.

The remaining solution to be evaporated or concentrate trickles down through throttle orifices 128 of the passage 120 or channel /the bottom portion of adiabatically evaporating phase transition compartment I/ into the adiabatically evaporating phase transition compartment of the next downstream work chamber therebeneath where it adiabatically evaporates as indicated again by arrows 169. The concentrate is exhausted in direction of arrows 184 into a next downstream stage, and so on.

Vapours formed in the adiabatically evaporating phase transition compartment I and withdrawing therefrom in the direction of arrows 169 become precipitated in the condensing phase transition subcompartments II1 and II2 by contacting the cooled confining plates 100. A distillate formed by the resulting condensate runs down along the surfaces of the confining plates 100 and reaches the passage 120 or channel of the next stage therebeneath via throttle orifices 130 as indicated by arrows 185. Thus, it passes one stage after the other each time taking up new amounts formed in respective condensing phase transition compartments of subsequent stages without being contaminated by the concentrate which is reliably separated from it by the partitions 112.

Concerning a final stage where the concentrate /passage 120 and arrows 184/ and the distillate /passage 124 and arrows 185/ are abducted reference may be taken e.g. to FIG. 17b or to FIG. 31.

Air and other gases may withdraw with the distillate as indicated by arrows 185.

The significance of the instant case will now be readily understood. As is known, confining plates 100 are, as a rule, made of sheet metal and, thus, relatively expensive component parts. The advantage of an evaporator as shown in FIG. 37 consists in that practically the entire surface area of a confining plate 100 is exploited for the transfer of heat because spacers 102 and shoulders 208 join it, as it were, along edges and, thus, leave it entirely unobstructed. This is rendered possible because spacers are abutted against confining plates where throttled liquid penetration might be substituted for sealing and, thus, very small contact areas may be permitted. Obviously, no quality deterioration or thermal losses will be encountered due to trickling-through of distillate from the condensing phase transition subcompartments of an upstream work chamber into such subcompartments of a subsequent stage along joint gaps between spacer edges and confining plates as has been hinted at above.

An exemplified detail shown in FIG. 38 differs from its counterpart in FIG. 37 by that the spacer 102 and the partition 112 are mutually independent component parts. In the instant case, the partitions 112 are extensions of inserts made of sheets and fit into interstices of the spacer 102. Such design permits an extended use of sheet metal technology.

SORPTION-TYPE REFRIGERATORS IN PRINCIPLE

The basic idea of the present invention to build up heat-engineering apparatus of casings is not restricted to evaporators. It is possible to employ such principle with even more intricate devices such as sorption type refrigerators.

Figure 39:
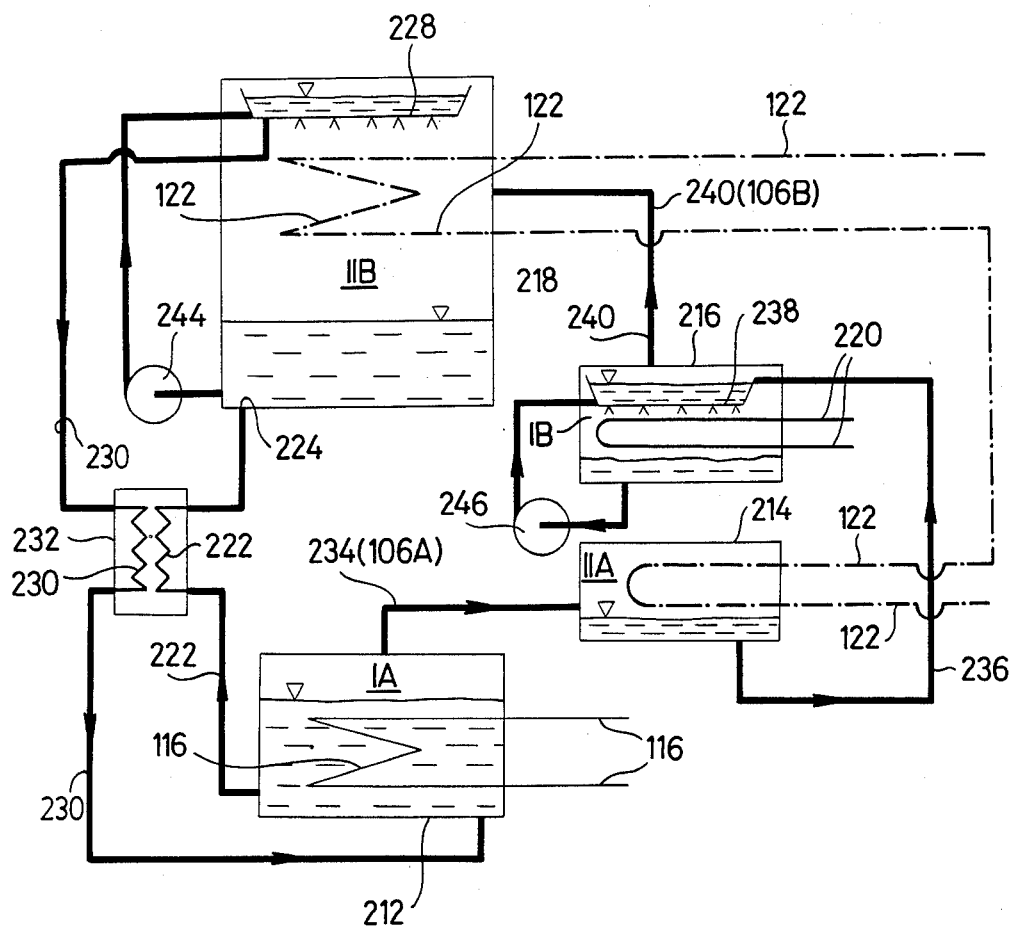
FIG. 39 is a partly conventional connection diagram of a sorption-type refrigerator.

Apart from two details a connection diagram of conventional sorption-type refrigerators is shown in FIG. 39.

A boiler 212, a condenser 214, an evaporator 216 and an absorber 218 are notorious with refrigerators. Boiler 212 is warmed up by a heating medium such as steam flowing in a passage 116. Condenser 214 and absorber 218, on the other hand, are cooled by a cooling fluid such as water flowing in a passage 122. Evaporator 216 is associated with a passage 220 which serves for abducting a useful cooling output by means of a heat-transfer medium such as brine.

The bottom portion or liquid room of boiler 212 is connected by a passage 222 to a lowmost inlet 224 of absorber 218 with a distributing tray 228. This is connected by a passage 230 to the liquid room of boiler 212. Passages 222 and 230 are in heat-transfer relationship with one another by means of a heat exchanger 232.

The upper portion or vapour room of boiler 212 is connected by a passage 234 to the upper portion or vapour room of condenser 214. The lower portion or liquid room of condenser 214 communicates through a passage 236 with a distributing tray 238 of evaporator 216.

The upper portion or vapour room of evaporator 216 opens through a passage 240 into the upper portion or vapour room of absorber 218.

In the boiler 212 and in the condenser 214 the same pressure prevails at which evaporation and condensation take place. Accordingly, their enclosures constitute associated evaporating phase transition compartment IA and condensing phase transition compartment IIA, respectively, of a first or upstream work chamber IA-IIA.

Likewise, the enclosures of evaporator 216 and absorber 218 have the same pressure prevailing therin at which evaporation and absorption occur so that they function as an evaporating phase transition compartment IB and an absorbing phase transition compartment IIB of a second or downstream work chamber IB-IIB.

Obviously, the first work chamber IA-IIA comprises the evaporator 212 and the condenser 214 while the second work chamber IB-IIB comprises the evaporator 216 and the absorber 218. Since absorbing is—according to the terminology employed in the present specification—an inverse course of evaporation, the respective phase transition compartment is entitled to reference character IIB.

As will be apparent, since both work chambers IA-IIA and IB-IIB communicate with each other through liquid conducting passages 222, 230, 234, 236 and 240, pressure differences therebetween are maintained by the weight of liquid columns.

Both details referred to above and additional to conventional sorption-type refrigerators consist in a pair of pumps 244 and 246 connected between the liquid room and the distributing tray 228 of the absorber, and the liquid room and the distributing tray 238 of the evaporator 216, respectively. They are needed because liquid surfaces in the evaporator 216 and the absorber 218 happen to be too small for an effective evaporation and absorption, respectively, if the refrigerator is built up of casings in compliance with the present invention. By circulating the respective liquids therein such surfaces become, as it were, artificially increased which, in contrast to conventional refrigerators, is readily feasible with the present invention as will be seen hereinafter.

For work medium an aqueous solution of lithium bromide /LiBr/ may be used in which the lithium bromide represents a cooling agent.

In operation, a work medium rich in a cooling agent re-referred to in the art as "rich solution" is flowing into the boiler via the passage 230. Due to the heating action of steam flowing in the passage 116 the cooling agent is evaporated in boiler 212 from the rich solution and is introduced via the passage 234 into the condenser 214 where it is precipitated in the form of a condensate under the cooling action of water flowing in passage 122.

The condensate is raised by the pressure of liquid columns onto the distributing tray 238 of the evaporator 216 and, thus, withdrawn from the first work chamber IA-IIA.

In the evaporator 216 the condensate of the cooling agent overflowing the distributing tray 238 evaporates under the heating action of the relatively warmer brine flowing in passages 220 which, in turn, cools down and carries off the useful cooling output of the refrigerator.

Condensate of the cooling agent collected in the bottom portion of the evaporator is anew raised onto the distributing tray 238 by pump 246 while its vapours flow via the passage 240 into the vapour room of absorber 218.

Due to evaporation of the cooling agent in boiler 212 the work medium becomes what is called in the art "weak solution" and flows through passage 222 and heat exchanger 232 to the inlet 224 where it is admixed to a rich solution coming from the bottom portion of absorber 218.

The rich solution is raised by pump 244 onto the distributing tray 228 of absorber 218.

From here it is, on the one hand, overflowing into the vapour room of absorber 218 therebelow and absorbs the vapours of the cooling agent arriving through passage 240. The thus enriched solution collects in the bottom portion or liquid room of absorber 218.

On the other hand, the rich solution flows via the passage 230 back into the liquid room of boiler 212 while it is warmed up by the hot weak solution in heat exchanger 232.

Thus, the weak solution is cooled down prior to its arrival via the passage 222 to the inlet 224.

A complete refrigerating cycle is herewith closed.

A SORPTION-TYPE REFRIGERATOR COMPOSED OF CASINGS

A sorption-type refrigerator of the above described working principle built up of casings in compliance with the present invention is illustrated in FIGS. 40 to 45.

Basically, all what is needed are simple confining plates 100 and a pair of spacers 102j and 102k.

Figures 40, 41:
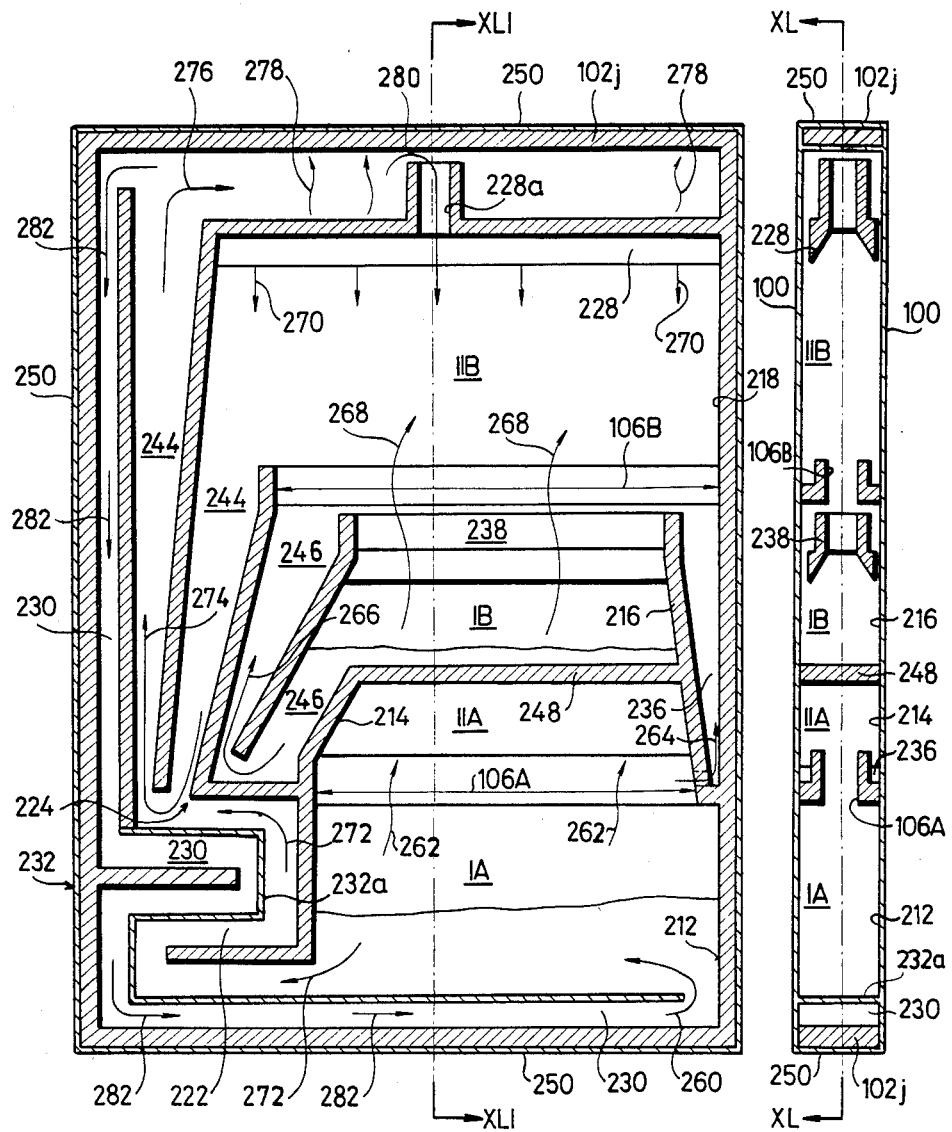
FIG. 40 shows a sectional view taken along line XL—XL of FIG. 41 of an exemplified refrigerator embodying the connection diagram according to FIG. 39.
FIG. 41 represents a transverse sectional view taken along line XLI—XLI of FIG. 40.

Details of spacers 102j are shown in FIGS. 40 and 41. It is seen that an upstream or first work chamber IA-IIA and a downstream or second work chamber IB-IIB are disposed directly above one another beneath and over, respectively, a partition 248. The phase transition compartments of each work chamber IA-IIA and IB-IIB open, in compliance with one of the main features of the present invention, directly into one another through orifices 106A and 106B, respectively. Thus, passages 234 and 240 /FIG. 39/ formed by pipe conduits in conventional refrigerators may be dispensed with as indicated by the association of their reference characters with those of the orifices 106A and 106B in brackets.

In the instant case the orifices 106A and 106B are extended practically to the whole contacting areas of associated phase transition compartments IA and IIA and IB and IIB, respectively, as was the case with FIG. 2.

The distributing tray 228 of the absorber 218 has a chimney 228a formed in the middle portion of it.

The heat-transfer area 232a of the heat exchanger 232 may be fashioned from the spacer 102j which shows the versatility of the spacer concept according to the invention.

Pumps 244 and 246, simbolically indicated in FIG. 39, are, in the instant case, constituted by first and second thermosiphons, respectively, designated by the same reference characters.

As will be seen, the above described passages 222, 230, 236, orifices 106A and 106B, and thermosiphons 244 and 246 interconnect the phase transition compartments of both work chambers IA-IIA and IB-IIB in the manner of sorption-type refrigerators.

The spacer 102j is sandwiched by a pair of confining plates 100 of its flat side size. The confining plates 100 are, along their circumferences, joined by a web plate 250. The latter may be integral with one of the confining plates 100 or else consist of two parts each integral with an other confining plate and abutted against one another to form a casing.

After filling in a work medium the confining plates 100 and the web plate 250 will be mutually fixed e.g. by means of welding so as to form a hermetically closed work casing 100-102j-250-100.

Figure 42:
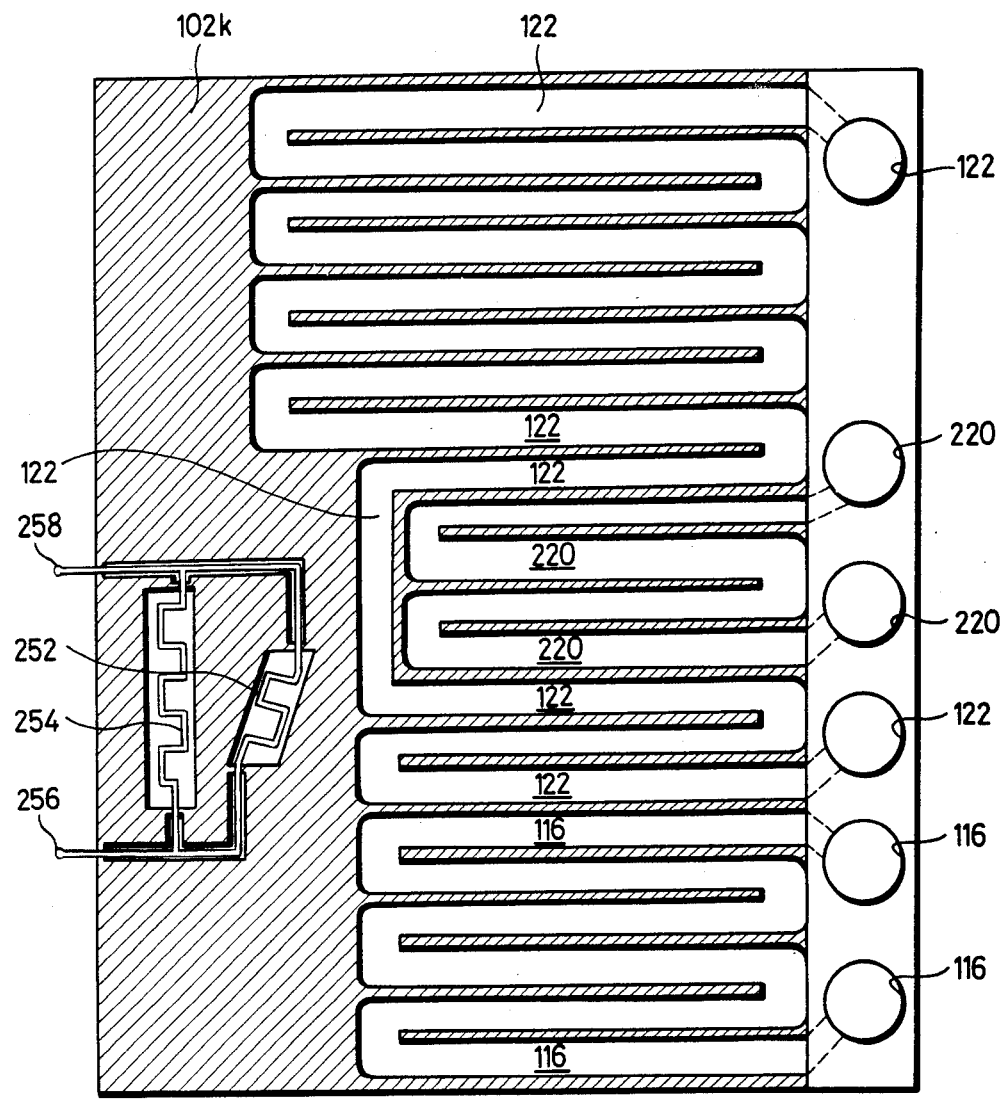
FIG. 42 illustrates a partly sectional view taken along line XLII—XLII of FIG. 43.

A detailed illustration of spacer 102k is shown in FIG. 42.

Spacer 102k comprises, in addition to passages 116 for heating and 122 for cooling, respectively, previously described a further passage 220 in which a heat-transfer medium such as brine is circulated for abducting a useful cooling output as has been described in connection with FIG. 39.

Furthermore, spacer 102k is provided with electric heating elements 252 and 254 which serve as means for heating the ascending branches of thermosiphons 244 and 246, respectively. In the instant case, elements 252 and 254 form a parallel connection joined, in a manner known per se, by means of conductors 256 and 258 to a d.c. or a.c. electrical power supply, not shown.

Figure 43:
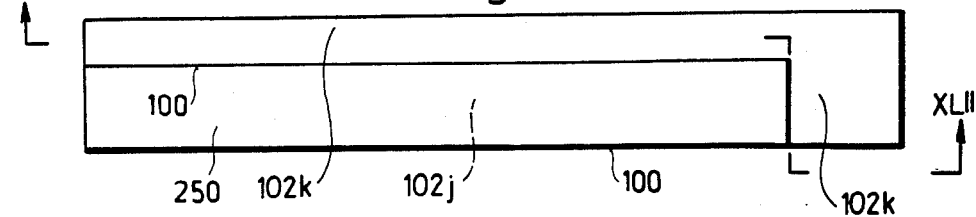
FIG. 43 is a top view of a detail of FIG. 44 at an enlarged scale.

As represented in FIG. 43, spacer 102k is shaped in the form of an L. Its shorter leg is destined to overlap one edge or narrow side of work casing 100-102j-250-100 and, therefore, its width corresponds to the axial size of the latter. Collecting and distributing sections of passages 116, 122 and 220 are disposed in that overlapping portion of spacer 102k as shown in FIG. 42.

Figure 44:
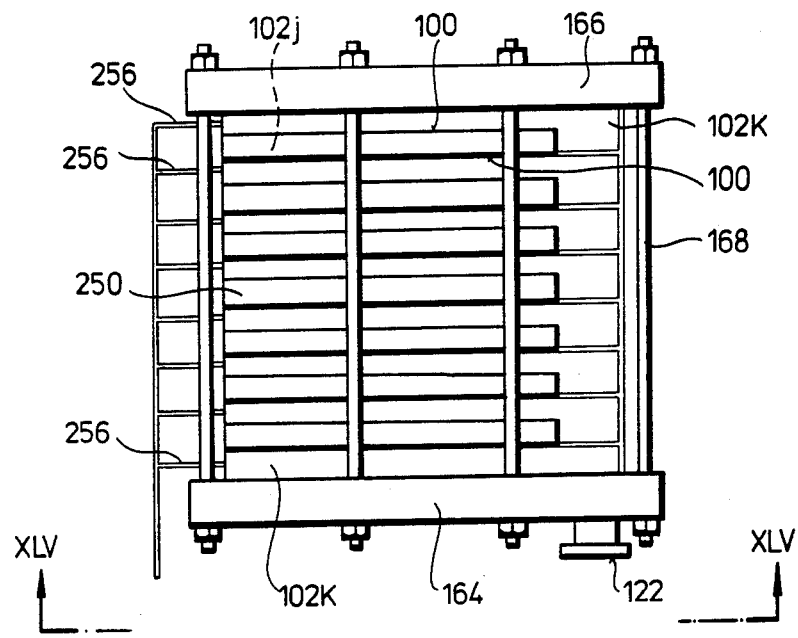
FIG. 44 shows a top view of the refrigerator embodying the connection diagram represented in FIG. 39.
Figure 45:
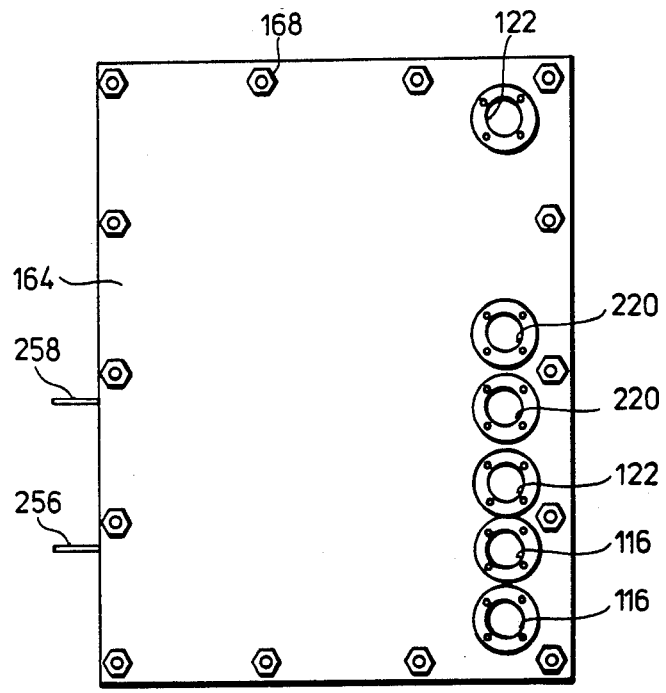
FIG. 45 is a front-elevational view taken along line XLV—XLV of FIG. 44.

Mutual arrangement of hermetically closed casings 100-102j-250-100 and spacers 102k is represented in FIG. 44. Each work casing 100-102j-250-100 is sandwiched by a pair of spacers 102k. A series of such juxtaposed units is, in turn, sandwiched by a front plate 164 /FIG. 45/ and a back plate 166. Obviously, confining plates 100 attached to work casings 100-102j-250-100 are common to both types of units once they are assembled as shown in FIG. 44 and mutually fixed by in-and-out bolts 168 in which case spacers 102k with common confining plates 100 constitute, as it were, auxiliary casings 100-102k-100 with respect to work casings 100-102j-250-100.

Moreover, it will be seen that in such assembled position the heating passage 116 and the cooling passage 122 in auxiliary casings 100-102k-100 register with the boiler 212 and with both the conductor 214 and the absorber 218, respectively, in work casings 100-102j-250-100 while passage 220 in auxiliary casings 100-102k-100 registers with the evaporator 216 in work casings 100-102j-250-100. Likewise, the heating elements 252 and 254 in auxiliary casings 100-102k-100 register with the first and second thermosiphons 244 and 246, respectively, in work casings 100-102j-250-100.

In operation, a warmed up rich solution is supplied via passage 230 into the evaporating phase transition compartment IA in the boiler 212 as indicated by an arrow 260. Here the cooling agent becomes evaporated from the rich solution as suggested by arrows 262 under the action of heating by means of steam flowing in passages 116 of adjacent auxiliary casings 100-102k-100.

Vapours of the cooling agent flow through the orifice 106A into condensing phase transition compartment IIA where they are precipitated on the confining plates 100 the opposite sides of which are contacted by cooling water flowing in passages 122 of adjacent auxiliary casings 100-102k-100.

Precipitated condensate flows in direction of arrows 264 under the difference of pressure prevailing in the first or upstream work chamber IA-IIA and in the second or downstream work chamber IB-IIB via passages 236 onto the distributing tray 238 in evaporator 216 enclosing the evaporating phase transition compartment IB of work chamber IB–IIB. Here, it receives the heat of the brine circulating in passage 220 of adjacent auxiliary casings 100-102k-100 and evaporates. Thereby, the brine cools down and carries off the useful cooling output of the refrigerator.

Unevaporated condensate trickles down along confining plates 100 into the liquid room at the bottom portion of the evaporator 216 from where it is raised again by second thermosiphon 246 onto the distributing tray 238 as indicated by arrow 266 so as to further its evaporation. The driving force of the second thermosiphon 246 is ensured by heat transferred from the heating elements 252 in adjacent auxiliary casings 100-102k-100 through common confining plates 100.

Vapours of the cooling agent flow in direction of arrows 268 through the orifice 106B into the absorber 218 enclosing the absorbing phase transition compartment IIB of the second or downstream work chamber IB-IIB. There, they become absorbed by films of work medium flowing downwards along confining plates 100 as indicated by arrows 270. Thus, the work medium is again enriched in cooling agent and is transformed in rich solution.

After evaporation of the cooling agent in boiler 212 the remaining and now weak solution withdraws therefrom in direction of arrows 212 via the passage 222 and flows, likewise due to a difference of pressure prevailing in first or upstream work chamber IA-IIA and second or downstream work chamber IB-IIB, to inlet 224. Here it is intermixed with the rich solution withdrawing from absorber 218 and circulated therewith by first thermosiphon 244 as indicated by arrows 274. Thermosiphon 244 is driven by heat developed by heating elements 254 in adjacent auxiliary casings 100-102k-100 and transferred through common confining plates 100.

The rich solution flowing in thermosiphon 244 is raised by the latter to the level of distributing tray 228 of absorber 218 where it is bifurcated.

A portion of the rich solution is permitted to flow in direction of arrow 276 onto the distributing tray 228 thereby ensuring that confining plate areas within absorber 218 be suitably provided with work medium for the performance of absorption. Since this region of work casing 100-102j-250-100 is in heat-transfer relationship with passages 122 in adjacent auxiliary casings 100-102k-100, the rich solution is partly evaporated as indicated by arrows 218. However, vapours thus formed are permitted to flow back via the chimney 228a in direction of arrow 280 in the absorbing phase transition compartment IIB in absorber 218 and become anew absorbed.

An other portion of the rich solution flows via passage 230 back into boiler 212 as indicated by arrows 282. It is warmed up in heat exchanger 232 by the heat of the weak solution flowing in counter-current therewith in direction of arrow 272 which is, in turn, cooled down.

As will now be apparent from what has been explained above, a pair of work casing 100-102j-250-100 and auxiliary casing 100-102k-100 actually perform a complete refrigerating cycle inherent to the connection diagram shown in FIG. 39. Thus, the invention permits to manufacture also sorption-type refrigerators in mechanized mass production.

Though, in the instant case, thermosiphons are used for pumps 244 and 246, it will be apparent that other types of pumps such as mechanic or electromechanic devices might be employed as well. However, thermosiphons which are readily feasible with the present invention are, because of their simplicity, superior as regards both construction and operation.

CLOSING REMARKS

Hereinbefore the invention has been described with spacers in the form of separate inserts for reasons of lucidity of explanation. It is, however, apparent that confining plates themselves could have been fashioned to spacers as described in connection with FIG. 7 which illustrates such principle.

Concerning the work materials selected for various parts of casings it is to be considered that the most stringent requirement to be met by confining plates is their suitable heat conductivity. Therefore, they will preferably be made of sheet metal.

On the other hand, work materials for spacers will be selected in consideration of their function. For instance, in the exemplified embodiment shown in FIG. 38 the partitions 112 may be made of sheet metal while the spacer 102 itself may be drawn or cast. Or, it has been mentioned in connection with FIG. 43 that the heat-transfer area 232a of the heat exchanger 232 may be fashioned from the spacer 102j. However, for reasons of good heat conductivity it may be made of sheet metal while other portions of the spacer 102j may consist of a work material of poor heat conductivity such as plastics.

Moreover, while work casings 100-102j-250-100 are covered with sheet metal, the spacers 102k which form the auxiliary casings 100-102k-100 when sandwiched by a pair of work casings 100-102j-250-100 may entirely be of synthetic material, a possibility obviously of great bearings on production costs.

With the exception of FIG. 37, spacers have been shown only where they perform heat-engineering functions. It is, however, apparent that spacers have also static significance. Thus, in contrast to illustration, they will be employed whereever there is need to counteract indenting or bulging forces due to difference of pressures prevailing on opposite sides of confining plates as shown in FIG. 37.

Heat-engineering outputs and, thus, sizes of heat-engineering apparatus according to the present invention as well as numbers of employed casings may vary within wide limits. However, the present invention permits to obtain a required output simply by varying the number of uniform casings as has been hinted at. Consequently, a limited series of casings of different sizes will permit to compose heat-engineering apparatus of very different outputs which is obviously an outstanding advantage of the present invention.

We claim:

1. In a heat-engineering apparatus comprising elements designed, sized and arranged for carrying out thermodynamic processes in which a work medium undergoes mutually opposite phase transitions comprising evaporation and condensation without the need to provide an enclosing vessel for the apparatus, the apparatus comprising casings consisting of confining plates and spacers therebetween, phase transition compartments in said casings, passages connecting pairs of said phase transition compartments with one another so as to form a number of work chambers, passages connecting said work chambers in series to as to form stages of mutually opposite phase transitions, and passages for introducing and withdrawing said work medium into and from said phase transition compartments; the improvement comprising means for precluding the need for transition third compartments, said means being characterized in that at least two adjacent casings enclose an even number of and not less than four phase transition compartments in superimposed relationship, said work medium introducing passages being delimited from the interior of said casings by said confining plates and said spacers, and said passages connecting the members of the pairs of phase transition compartments being orifices free from pipe structure in partitions separating the former from one another within said casings.

2. In a heat-engineering apparatus as claimed in claim 1 a plurality of casings /100i-102h-100i/ abutted against one another flatwise along common confining plates /100i/,
spacers /102h/ in said casings,
a plurality of phase transition compartments /IA, IB, . . . / of the same function in each of said casings, and
siphons /128A, 128B, . . . / formed by said spacers /102h/ and interconnecting said phase transition compartments /IA, IB, . . . / in each of said casings /100i-102h-100i/ /e.g. FIG. 35/.

3. In a heat-engineering apparatus as claimed in claim 2 a first casing /100b-102a-100a/,
a second casing /100a-102b-100b/ adjacent to said first casing,
siphons /128A2/ in said second casing, and
a cooling passage /156/ in said first casing registering at least partly with said siphons /e.g. FIGS. 11 and 12/.

4. In a heat-engineering apparatus as claimed in claim 1 a casing /100b-102a-100a/,
a spacer /102a/ in said casing,
an evaporating phase transition /IA1/ compartment in said casing, and a demister means /142A1/ downstream said evaporating phase transition compartment /IA1/ formed by said spacer /102a/ /e.g. FIG. 11/.

5. In a heat-engineering apparatus as claimed in claim 1
a condensing phase transition compartment /IIA/, and
a deaerating compartment /162A/ communicating with said condensing phase transition compartment through a pressure reducing means /132A/ /FIGS. 13 and 14/.

6. In a heat-engineering apparatus as claimed in claim 5
a condensing phase transition compartment /IIA/ with a pressure reducing means /132A/, and
an extension /158A/ in said condensing phase transition compartment upstream said pressure reducing means delimiting a pre-deaerating bay or niche /160A/ in said condensing phase transition compartment /IIA/ /FIG. 13/.

7. In a heat-engineering apparatus as claimed in claim 5
a plurality of casings /100b-102c-100b/ condensing phase transition compartments /IIA/ in said casings, and
a further casing /164-102d-100c/ comprising deaerating compartments /162A/ communicating pairwise with said condensing phase transition compartments /IIA/ /FIGS. 11 to 14/.

8. In a heat-engineering apparatus as claimed in claim 1 and formed as a multi-effect evaporator
a pair of adjacent casings /100a-102b-100b, 100b-102c-100b/ abutted against one another, flatwise along a common confining plate /100b/,
at least two evaporating phase transition compartments /IA2, IB2/ in one of said casings /100a-102b-100b/,
at least two condensing phase transition compartments /IIA, IIB/ in the other one of said casings /100b-102c-100b/,
an upstream work chamber /IA2-IIA/ consisting of one /IA/ of said evaporating phase transition compartments and one /IIA/ of said condensing phase transition compartments, and
a downstream work chamber /IB2-IIB/ consisting of the other one /IB2/ of said evaporating phase transition compartments and the other one /IIB/ of said condensing phase transition compartments,
the condensing phase transition compartment /IIA/ of said upstream work chamber /IA2-IIA/ being in heat-transfer relationship with the evaporating phase transition compartment /IB2/ of said downstream work chamber /IB2-IIB/ through said common confining plate /100b/ /FIGS. 12 and 13/.

9. In a heat-engineering apparatus as claimed in claim 8
a pair of adjacent casings /100a-102b-100b, 100b-102c-100b/,
a common confining plate /100b/ therebetween,
an upstream work chamber /IA2-IIA/,
a downstream work chamber /IB2-IIB/,
said work chambers comprising each an evaporating phase transition compartment /IA2/ in one of said casings /100a-102b-100b/ and a condensing phase transition compartment /IIA/ in the other one of said casings /100b-102c-100b/, an overflow weir /138A2/ at the downstream end of the evaporating phase transition compartment /IA2/ of said upstream work chamber,
a channel /118A2-120A2/ communicating with the evaporating phase transition compartment /IA2/ of said upstream work chamber through said overflow weir /138A2/,
a partition /140A2/ in said channel,
a vapour conducting passage /118A2/ on one side of said partition /140A2/,
a liquid conducting passage /120A2/ on the other side of said partition /140A2/,
a vortex chamber /142A2/ at the end of said vapour conducting passage /118A2/,
an orifice /106A2/ in said common confining plate /100b/ at the center of said vortex chamber /142A2/ opening directly into the condensing phase transition compartment /IIA/ of said upstream work chamber /IA2-IIA/, and
a siphon /128A2/ connecting said liquid conducting passage /120A2/ with the evaporating phase transition compartment /IB2/ of said downstream work chamber /IB2-IIB/ /FIGS. 12 and 13/.

10. In a heat-engineering apparatus as claimed in claim 9
a downstream work chamber /IB1-IIB/,
an evaporating phase transition compartment /IB1/ in said downstream work chamber,
an overflow weir /138B2/ at the downstream end of said evaporating phase transition compartment, and
a dam /146B2/ at the upstream end of said evaporating phase transition compartment lower than said overflow weir /138B2/ /e.g. FIGS. 12 and 13/.

11. In a heat-engineering apparatus as claimed in claim 8
a first casing /100b-102a-100a/,
a second casing /100a-102b-100b/,
a first common confining plate /100a/ there between,
evaporating phase transition compartments /IA1, IB1; IA2, IB2/ in said first casing and said second casing,
orifices /134A, 134B/ in said first common confining plate /100a/ connecting pairwise the evaporating phase transition compartments /IA1, IB1/ in said first casing with the evaporating phase transition compartments /IA2, IB2/ in said second casing,
a third casing /100b-102c-100b/ adjacent to one of said first and second casings,
a second common confining plate /100b/ between said third casing and the pair of said first and second casings,
condensing phase transition compartments /IIA, IIB/ in said third casing, and
siphons /128A1, 128B1; 128A2, 128B2/ in said first and second casings interconnecting the evaporating phase transition compartments /IA1, IB1; IA2, IB2/ of said first and second casings, respectively, and having each a common intermediate branch in one /100a-102b-100b/ of said first and second casings,
a cooling passage /156/ in the other one /100b-102a-100a/ of said first and second casings for conducting a solution to be evaporated,
siphons /130A, 130B/ in said third casing /100b-102c-100b/ interconnecting its condensing phase transition compartments /IIA, IIB/ and having each an intermediate branch, the common intermediate branches of the siphons in said first and second casings being in heat-transfer relationship with said cooling passage /156/ through said first common confining plate /100a/, and with the intermediate branches of the siphons in said third casing through said second common confining plate /100b/ /FIGS. 11 to 13/.

12. In a heat-engineering apparatus as claimed in claim 8
   a casing /e.g. 100a-102b-100b/,
   an upstream phase transition compartment /IA2/ in said casing,
   a downstream phase transition compartment /IB2/ in said casing, and
   a heat-transfer area in each of said phase transition compartments,
   the heat-transfer area in said upstream phase transition compartment being greater than the heat-transfer area in said downstream phase transition compartment /FIGS. 11 to 13/.

13. In a heat-engineering apparatus as claimed in claim 8
   a pair of adjacent casings /100a-102b-100b and 100b-102c-100b/,
   a common confining plate /100b/ therebetween,
   a downstream condensing phase transition compartment /IIC/ in one /100b-102c-100b/ of said adjacent casings, and
   a cooling passage /122b/ in the other one /100a-102b-100b/ of said adjacent casings in heat-transfer relationship with said downstream condensing phase transition compartment /IIC/ through said common confining plate /100b/ /FIGS. 12 and 13/.

14. In a heat-engineering apparatus as claimed in claim 8
   a pair of adjacent /100a-102b-100b and 100b-102c-100b/,
   a common confining plate /100b/ therebetween,
   an upstream evaporating phase transition compartment IA2/ in one /100a-102b-100b/ of said adjacent casings, and
   a heating passage /116/ in the other one /100b-102c-100b/ of said adjacent casings in heat-transfer relationship with said upstream evaporating phase transition compartment /IA2/ through said common confining plate /100b/ /FIGS. 12 and 13/.

15. In a heat-engineering apparatus as claimed in claim 1 and formed as a multi-flash evaporator
   a plurality of work chambers /I-II1-II2/ comprising each an adiabatically evaporating phase transition compartment /I/ and a condensing phase transition compartment /II1-II2/, and
   throttle means /128/ separating the adiabatically evaporating phase transition compartments /I/ of said work chambers from one another /e.g. FIG. 37/.

16. In a heat-engineering apparatus as claimed in claim 15
   an upstream condensing phase transition compartment /IIA/,
   a downstream condensing phase transition compartment /IIB/, and
   a heat-transfer area in each of said condensing phase transition compartments /IIA, IIB/,
   the heat-transfer area in said upstream condensing phase transition compartment /IIA/ being smaller than the heat-transfer area in said downstream condensing phase transition compartment /IIB/ /e.g. FIG. 36/.

17. In a heat-engineering apparatus as claimed in claim 15
   a casing /100f-102e-100d/,
   a first partition /112/ in said casing separating a lower adiabatically evaporating phase transition compartment /IA/ from an upper condensing phase transition compartment /IIA/, and
   an orifice /106A/ for the passage of vapours in said first partition /112/ opening directly from said adiabatically evaporating phase transition compartment /IA/ into said condensing phase transition compartment /IIA/ /e.g. FIG. 16a/.

18. In a heat-engineering apparatus as claimed in claim 17
   a pair of adjacent casings /100f-102e-100d and 100d-102f-100e/,
   a common confining plate /100d/ therebetween,
   adiabatically evaporating phase transition compartments /IA, IB/ in said adjacent casings on both sides of said common confining plate /100d/,
   siphons /IA-128-IB/ for serving as throttle means between adjacent adiabatically evaporating phase transition compartments constituted by a pair of adjacent adiabatically evaporating phase transition compartments /IA and IB/ and an orifice /128/ in said common confining plate /100d/ at the lower extremity thereof /FIG. 16a/.

19. In a heat-engineering apparatus as claimed in claim 17
   an adiabatically evaporating phase transition compartment /IY/ associated with a plurality of condensing phase transition subcompartments /IIY1, IIY2/, and
   cooling passages, /114/ sandwiched pairwise by said condensing phase transition subcompartments /IIY1, IIY2/ /FIG. 16b/.

20. In a heat-engineering apparatus as claimed in claim 19
   cooling passages /114/,
   packings /113/ in said cooling passages sealing them against the ambiency, and
   a removable lid /192/ carrying said packings /FIG. 30/.

21. In a heat-engineering apparatus as claimed in claim 17
   a casing /100f-102e-100d/,
   a first partition /112/ in said casing separating a lower adiabatically evaporating phase transition compartment /I/ from an upper condensing phase transition compartment /II/,
   a second partition /182/ in said adiabatically evaporating phase transition compartment /I/ transverse of said first partition /112/,
   a distillate conducting passage /124/ delimited against said adiabatically evaporating phase transition compartment /I/ by said second partition /182/ /e.g. FIGS. 16a and 27/.

22. In a heat-engineering apparatus as claimed in claim 21
   a first partition /112/,
   a second partition /182/,
   a distillate conducting passage /124/,
   orifices /106/ in said first partition for the passage of vapours,
   a distillate collecting trough /200/ beneath said orifices /106/ in said first partition /112/, and a distillate discharging orifice /202/ in said second partition /182/ at the downstream end of said trough /200/ /FIG. 30/.

23. In a heat-engineering apparatus as claimed in claim 15
   a pair of casings /100i-102h-100i and 100i-102i-100i/, and
   a plurality of phase transition compartments /IA, IB; IIA, IIB/ of the same function arranged above one another in each casing /FIGS. 35 and 36/.

24. In a heat-engineering apparatus as claimed in claim 23
   a pair of adjacent casings /100i-102h-100i and 100i-102i-100i/,
   a plurality of adiabatically evaporating phase transition compartments /IA, IB/ in one /100i-102h-100i/ of said adjacent casings, and
   a plurality of condensing phase transition compartments /IIA, IIB/ in the other one /100i-102i-100i/ of said adjacent casings /FIGS. 35 and 36/.

25. In a heat-engineering apparatus as claimed in claim 24
   a pair of casings /100i-102h-100i and 100i-102i-100i/,
   a common confining plate /100i/ therebetween,
   an adiabatically evaporating phase transition compartment /IA/ formed as a vortex chamber,
   a condensing phase transition compartment /IIA/, and
   an orifice /106A/ in said common confining plate /100i/ at the center of said vortex chamber connecting said adiabatically evaporating phase transition compartment /IA/ directly with said condensing phase transition compartment IIA/ /FIGS. 35 and 36/.

26. In a heat-engineering apparatus as claimed in claim 25
   a vortex chamber, and
   a curved hozzle /204/ upstream said vortex chamber comprising an initial section /204a/ of contracting cross-sectional area and a final section /204b/ of expanding cross-sectional area /FIG. 35a/.

27. In a heat-engineering apparatus as claimed in claim 24
   a common confining plate /100i/,
   a pair of upstream work chambers /IA-IIA, IB-IIB/,
   a pair of downstream work chambers /IB-IIB, IC-IIC/,
   said work chambers comprising each an adiabatically evaporating phase transition compartment /IA, IB, IC/ and a condensing phase transition compartment /IIA, IIB, IIC/,
   first siphons /128B/ interconnecting the adiabatically evaporating phase transition compartments /IB, IC/ of said pair of downstream work chambers, and
   second siphons /130A/ interconnecting the condensing phase transition compartments /IIA, IIB/ of said pair of upstream work chambers,
   said siphons /128B, 130A/ being in heat-transfer relationship through said common confining plate /100i/ /FIGS. 35 and 36/.

28. In a heat-engineering apparatus as claimed in claim 24
   a first casing /100i-102h-100i/ comprising adiabatically evaporating phase transition compartments /IA, IB/,
   a second casing /100i-102i-100i/ adjacent to said first casing and comprising condensing phase transition compartments /IIA, IIB/,
   a common confining plate /100i/ therebetween,
   a supply passage /114/ for conducting a solution to be evaporated in said first casing /100i-102h-100i/, and
   a cooling passage /122/ for conducting a cooling medium in said first casing,
   said passages /114, 122/ being in heat-transfer relationship with the condensing phase transition compartments /IIA, IIB/ in said second casing /100i-102i-100i/ through said common confining plate /100i/ /FIGS. 35 and 36/.

29. In a heat-engineering apparatus as claimed in claim 24
   a first casing /100i-102h-100i/ comprising adiabatically evaporating phase transition compartments /IA, IB/,
   a second casing /100i-102i-100i/ adjacent to said first casing and comprising condensing phase transition compartments /IIA, IIB/,
   a common confining plate /100i/ therebetween,
   a supply passage /114/ for conducting a solution to be evaporated in said first casing /100i-102h-100i/, and
   a heating passage /116/ in said second casing /100i-102i-100i/ in heat-transfer relationship with said supply passage /114/ through said common confining plate /100i/ /FIGS. 35 and 36/.

30. In a heat-engineering apparatus as claimed in claim 23
   a casing /100-102-100/
   complete work chambers /I-II1-II2/ arranged above one another in said casing and comprising each an adiabatically evaporating phase transition compartment /I/ and a pair of condensing phase transition subcompartments /II1, II2/ sandwiching said adiabatically evaporating phase transition compartment /I/ within said casing /100-102-100/ /FIG. 37/.

31. In a heat-engineering apparatus as claimed in claim 30
   an upstream adiabatically evaporating phase transition compartment /I/ delimited by an upstream channel /120/ for conducting a solution to be evaporated,
   a downstream adiabatically evaporating phase transition compartment beneath said upstream adiabatically evaporating phase transition compartment delimited by a downstream channel below said upstream channel /120/, and
   throttle orifices /128/ in said upstream channel /120/ above said downstream channel /FIG. 37/.

32. In a heat-engineering apparatus as claimed in claim 1 and formed as a sorption-type refrigerator
   a hermetically closed casing /100-102j-250-100/ with a filling of work medium,
   a first or upstream work chamber /IA-IIA/ in said hermetically closed casing comprising an evaporating phase transition compartment /IA/ and a condensing phase transition compartment /IB/,
   a second or downstream work chamber /IB-IIB/ in said hermetically closed casing comprising an evaporating phase transition compartment /IB/ and an absorbing phase transition compartment /IIB/, a boiler /212/ formed by the evaporating phase transition compartment /IA/ of said first or upstream work chamber /IA-IIA/, a condenser /214/ formed by the condensing phase transition compartment /IIA/ of said first or upstream work chamber /IA-IIA/, an evaporator /216/ formed by the evaporating phase transition compartment /IB/ of said second or downstream work chamber /IB-IIB/, an absorber /218/ formed by the absorbing phase transition compartment /IIB/ of said second or downstream work chamber /IB-IIB/, means /222, 230, 236, 106A, 106B, 244, 246/ in said hermetically closed casing interconnecting said boiler /212/, said condenser /214/, said evaporator /216/ and said absorber /218/ in the manner of a sorption-type refrigerator means /116/ for heating said boiler /212/, means /122/ for cooling said condenser /214/ and said absorber /218/, and means /220/ for abducting heat from said evaporator /FIG. 39/.

33. In a heat-engineering apparatus as claimed in claim 32 a hermetically closed casing /100-100j-250-100/ with a filling of work medium, thermosiphons /244–246/ in said hermetically closed casing for circulating said work medium therein, and means /252, 254/ for heating said thermosiphons /FIGS. 40 and 42/.

34. In a heat-engineering apparatus as claimed in claim 32 a hermetically closed casing /100-102j-250-100/, a spacer /102j/ therein, a heat exchanger /232/ in said spacer, a passage /230/ for conducting a strong solution, and a passage /222/ for conducting a weak solution, said passages /222, 230/ being in heat-transfer relationship with one another by means of said heat exchanger /232/ /FIG. 40/.

35. In a heat-engineering apparatus as claimed in claim 32 a hermetically closed work casing /100-102j-250-100/ with a filling of work medium comprising a boiler /212/, a condenser /214/, an evaporator /216/, an absorber /218/, a first thermosiphon /246/ associated with said evaporator /216/ for circulating said work medium therein, a second thermosiphon /244/ associated with said absorber /218/ for circulating said work medium therethrough, a pair of auxiliary casings /100-102k-100/ sandwiching said work casing /100-102j-250-100/ and comprising each a heating passage /116/ registering with said boiler /212/, a cooling passage /122/ registering with both said condenser /214/ and said absorber /218/, a passage /220/ registering with said evaporator /216/ for conducting a heattransfer medium, and heating means /252, 254/ registering with said fist thermosiphon /246/ and said second thermosiphon /244/ /FIGS. 43 and 44/.

* * * * *